United States Patent
Arakawa

(10) Patent No.: US 9,654,698 B2
(45) Date of Patent: May 16, 2017

(54) DIGITAL CAMERA AND EXPOSURE CONTROL METHOD

(71) Applicant: SOCIONEXT INC., Yokohama-shi, Kanagawa (JP)

(72) Inventor: Susumu Arakawa, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 43 days.

(21) Appl. No.: 14/724,350

(22) Filed: May 28, 2015

(65) Prior Publication Data

US 2015/0373246 A1    Dec. 24, 2015

(30) Foreign Application Priority Data

Jun. 20, 2014 (JP) ................................ 2014-127195

(51) Int. Cl.
*H04N 5/235* (2006.01)
*H04N 5/353* (2011.01)

(52) U.S. Cl.
CPC ......... *H04N 5/2353* (2013.01); *H04N 5/2351* (2013.01); *H04N 5/2356* (2013.01); *H04N 5/353* (2013.01)

(58) Field of Classification Search
CPC ..... H04N 5/2353; H04N 5/235; H04N 5/2356
See application file for complete search history.

(56) References Cited

U.S. PATENT DOCUMENTS

| 2006/0067670 | A1* | 3/2006 | Misawa | G03B 7/28 396/226 |
| 2010/0259636 | A1* | 10/2010 | Tzur | H04N 5/3355 348/222.1 |
| 2011/0298886 | A1* | 12/2011 | Price | H04N 5/2351 348/14.08 |
| 2012/0081579 | A1* | 4/2012 | Doepke | H04N 5/2355 348/231.99 |
| 2012/0105672 | A1* | 5/2012 | Doepke | H04N 5/2353 348/229.1 |
| 2015/0145952 | A1* | 5/2015 | Hirata | H04N 5/23206 348/38 |

FOREIGN PATENT DOCUMENTS

| JP | 2001-86396 A | 3/2001 |
| JP | 2008-42248 A | 2/2008 |

* cited by examiner

*Primary Examiner* — Abdelaaziz Tissire
(74) *Attorney, Agent, or Firm* — Arent Fox LLP

(57) ABSTRACT

A method performed by a digital camera includes calculating brightness of image data captured by an imaging device; determining whether the brightness of the image data is within a valid range for controlling a set exposure value of the imaging device; changing the set exposure value for each frame until the brightness of the image data becomes within the valid range, based on a difference between a first exposure value corresponding to a lower limit of the valid range and a second exposure value corresponding to an upper limit of the valid range; and after the brightness of the image data becomes within the valid range, controlling the set exposure value based on the brightness of the image data within the valid range and a valid exposure value corresponding to the brightness of the image data within the valid range.

6 Claims, 13 Drawing Sheets

DIGITAL CAMERA AND EXPOSURE CONTROL METHOD

CROSS-REFERENCE TO RELATED APPLICATION

This application is based upon and claims the benefit of priority of Japanese Patent Application No. 2014-127195 filed on Jun. 20, 2014, the entire contents of which are incorporated herein by reference.

FIELD

An aspect of this disclosure relates to a digital camera and a method of controlling exposure of the digital camera.

BACKGROUND

A digital camera typically includes an auto exposure (AE) function for automatically determining an exposure (see, for example, Japanese Laid-Open Patent Publication No. 2001-086396). Such a digital camera determines an exposure based on, for example, an image captured by an imaging device. Therefore, exposures of first few images (e.g., one to three images) initially captured by the imaging device may not be properly set. For example, in a digital camera including a display for displaying preview images, the first few images are used for AE calculations and are not displayed on the display. That is, this type of digital camera starts to display images only after an appropriate exposure is determined.

For this reason, there have been proposed methods for reducing the time taken by a digital camera to display an image after a user turns on the digital camera. In a proposed method, a digital camera sets an imaging device in a high-speed mode (where pixels are skipped) at start-up, and performs AE calculations while the frame rate is high. The digital camera performs AE calculations for respective frames, and gradually changes the exposure value for the frames until an appropriate exposure value is attained. Then, after the appropriate exposure value is attained through the AE calculations, the digital camera changes the drive mode of the imaging device to a normal full pixel mode, and displays the first image captured in the full pixel mode on a display.

In another method, instead of using a high-speed mode, a digital camera performs "one-shot AE" at start-up. In "one-shot AE", unless the brightness of an image captured by an imaging device is saturated, an appropriate exposure is determined with "one shot".

Also, Japanese Laid-Open Patent Publication No. 2008-042248, for example, discloses a digital camera that determines a temporary exposure value at start-up without using an image captured by an imaging device. This digital camera determines a temporary exposure value at start up based on, for example, an electromotive force obtained from electrical charge accumulated on a solid-state imaging device while the power is off.

In the method where a digital camera sets the drive mode of an imaging device to a high-speed mode at start-up, the digital camera switches the drive mode of the imaging device from the high-speed mode to a normal full pixel mode before displaying an image on a display. Accordingly, with this method, changing the drive mode of the imaging device causes a processing delay and increases the time necessary to capture an image with an appropriate exposure. Also, with the method where a digital camera performs "one-shot AE", when the brightness of an image captured by an imaging device is saturated, the digital camera needs to repeat the "one-shot AE" until the brightness of the image becomes unsaturated. In this case, the repetition of the "one-shot AE" causes a processing delay and increases the time necessary to capture an image with an appropriate exposure.

SUMMARY

According to an aspect of this disclosure, there is provided a method performed by a digital camera. The method includes calculating brightness of image data captured by an imaging device; determining whether the brightness of the image data is within a valid range for controlling a set exposure value of the imaging device; changing the set exposure value for each frame until the brightness of the image data becomes within the valid range, based on a difference between a first exposure value corresponding to a lower limit of the valid range and a second exposure value corresponding to an upper limit of the valid range; and after the brightness of the image data becomes within the valid range, controlling the set exposure value based on the brightness of the image data within the valid range and a valid exposure value corresponding to the brightness of the image data within the valid range.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments are described below with reference to the accompanying drawings.

Figure 1:
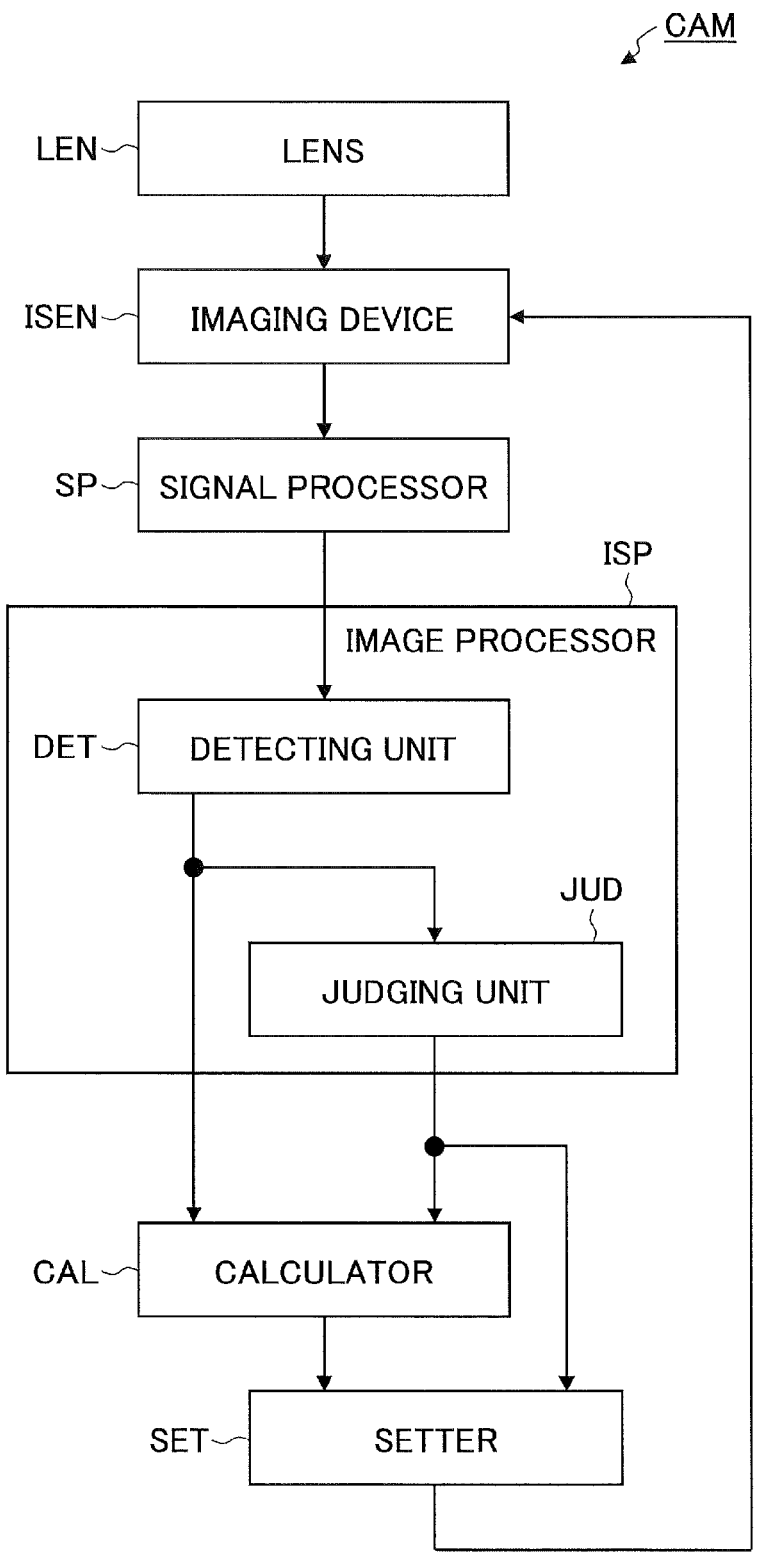
FIG. 1 is a block diagram illustrating an exemplary configuration of a digital camera.

FIG. 1 is a block diagram illustrating an exemplary configuration of a digital camera CAM according to an embodiment. The digital camera CAM includes an auto exposure (AE) function for automatically determining an exposure. For example, the digital camera CAM controls the exposure based on brightness (luminance) of an image captured by an imaging device ISEN.

The digital camera CAM may include a lens LEN, the imaging device ISEN, a signal processor SP, an image processor ISP, a calculator CAL, and a setter SET. The lens LEN includes one or more lenses such as a focus lens and a zoom lens, and focuses incident light on a light-receiving surface of the imaging device ISEN.

The imaging device ISEN captures an image. For example, the imaging device ISEN may be implemented by an image sensor such as a charge coupled device (CCD) image sensor or a complementary metal oxide semiconductor (CMOS) image sensor. Hereafter, the imaging device ISEN may also be referred to as a "sensor ISEN". The sensor ISEN, for example, generates electrical charge corresponding to the amount of light received via the lens LEN.

In other words, the sensor ISEN converts an image of an object (or light received via the lens LEN) into an electric signal and generates image data of the object. Thus, the sensor ISEN captures an image. The sensor ISEN is saturated when the amount of electrical charge generated based on the amount of light exceeds the maximum accumulation amount. In this case, image data output from the sensor ISEN is also saturated. Image data output from the sensor ISEN is an analog signal.

The signal processor SP is an example of a reader that reads image data from the sensor ISEN. For example, the signal processor SP reads image data (analog signal) corresponding to an image captured by the sensor ISEN. Then, the signal processor SP performs signal processing such as gain control and analog-to-digital (A/D) conversion on the image data (analog signal) read from the sensor ISEN. As a result, image data represented by a digital signal is generated.

The image processor ISP receives the image data (digital signal) from the signal processor SP. Then, the image processor ISP performs image processing such as conversion (encoding) and detection for AE control on the image data. For example, the image processor ISP may include a detecting unit DET and a judging unit JUD. Assuming that the digital camera CAM includes a display, an image corresponding to the image data processed by the image processor ISP is displayed on the display.

The detecting unit DET is an example of a detector that calculates brightness of image data captured by the sensor ISEN. For example, the detecting unit DET calculates the brightness (image brightness) of an image based on image data received from the signal processor SP. That is, the detecting unit DET performs detection for AE control based on image data corresponding to an image captured by the sensor ISEN. Then, the detecting unit DET outputs a detection result (data indicating the brightness of an image) to the judging unit JUD and the calculator CAL.

The judging unit JUD is an example of a determiner that determines whether the brightness of image data is within a valid range that is valid (or usable) for controlling the exposure value of the sensor ISEN. For example, the judging unit JUD determines whether the brightness of an image calculated by the detecting unit DET is within the valid range for exposure control. Then, the judging unit JUD outputs the determination result to the calculator CAL and the setter SET.

The valid range for exposure control is, for example, a range where the brightness of incident light of the sensor ISEN corresponds to the brightness of an image calculated based on image data. For example, when an object is captured outdoors under bright sunlight, image data output from the sensor ISEN may be saturated (exceed an upper limit). In such a case, the brightness of an image calculated based on the image data does not correspond to the brightness of incident light of the sensor ISEN. For this reason, the upper limit of the valid range for exposure control may be set, for example, at image brightness that corresponds to the maximum value in a range where image data received by the detecting unit DET is not saturated.

On the other hand, when an object is dark, an output (luminance) of the sensor ISEN may become insufficient, and the brightness (or darkness) of an image calculated based on image data may become substantially equal to image brightness (or minimum luminance) calculated based on the lowest value of image data. In this case, it is difficult to accurately distinguish between the brightness of an image calculated based on image data and the minimum luminance. For this reason, the lower limit of the valid range for exposure control may be set, for example, at image brightness that corresponds to the minimum value of image data with which brightness distinguishable from the minimum luminance can be calculated.

The calculator CAL controls the exposure based on an exposure value with which the brightness of image data has become within the valid range and the image data. For example, the calculator CAL calculates an exposure value corresponding to target brightness based on the brightness of an image. Hereafter, an exposure value may also be referred to as an EV value. The EV value indicates, for example, an exposure (the amount of light) that is calculated based on a lens aperture and an exposure time (shutter speed). For example, each time the EV value increases by one, the amount of light received by the sensor ISEN decreases to one half.

For example, when a determination result received from the judging unit JUD indicates that the brightness of an image is within the valid range, the calculator CAL calculates an EV value corresponding to target brightness based on the brightness of the image calculated by the detecting unit DET. Then, the calculator CAL outputs the calculated EV value to the setter SET. The setter SET sets the EV value calculated by the calculator CAL in the sensor ISEN so that an image is captured with an exposure that imparts the target brightness to the image. Hereafter, an exposure that imparts the target brightness to an image may also be referred to as an "appropriate exposure".

For example, when the target brightness is 18% of the output range of the sensor ISEN and the output range of the sensor ISEN is between 0 and 1023, the target brightness is about 184 (=1023×0.18). In this case, the digital camera CAM controls the EV value so that the brightness of an image becomes about 184. For example, the calculator CAL calculates an EV value for achieving image brightness of about 184 based on an EV value used to capture an image and the brightness of the image (which is calculated by the detecting unit DET).

The setter SET changes the exposure value for each frame by a predetermined adjustment amount until the brightness of image data becomes within the valid range. The adjustment amount may be determined in advance based on, for example, a difference between an exposure value corresponding to the lower limit of the valid range and an exposure value corresponding to the upper limit of the valid range. For example, the adjustment amount may be determined, in advance, at a value that is less than or equal to $\log_2$ (upper limit/lower limit). When an EV value corresponding to image brightness within the valid range is searched for by simply increasing or decreasing the EV value by the adjustment amount and the adjustment amount is less than or equal to $\log_2$ (upper limit/lower limit), it is possible to improve the search efficiency by increasing the adjustment amount (or a step size).

The digital camera CAM may be configured to store the predetermined adjustment amount in a storage such as a rewritable/non-rewritable register or memory. The predetermine adjustment amount may be calculated by the calculator CAL.

For example, until a determination result indicating that the brightness of an image is within the valid range is received from the judging unit JUD, the setter SET obtains an EV value for each frame by adding or subtracting the predetermined adjustment amount to or from an EV value used for a previous frame, and sets the obtained EV value in the sensor ISEN. Also, multiple step sizes corresponding to "1×adjustment amount" and "n×adjustment amount" (n is an integer greater than or equal to 2) may be used for the EV value.

For example, the setter SET may be configured to set an initial value that is greater than or equal to a minimum EV value (the smallest value that can be set as an EV value) and less than or equal to 7 as a first EV value for the first frame, to set a value obtained by adding "2×adjustment amount" to the first EV value for the first frame as a second EV value for the second frame, and to set a value obtained by subtracting "1×adjustment amount" from the second EV value for the second frame as a third EV value for the third frame. The initial value of the EV value is not limited to a value that is greater than or equal to the minimum EV value and less than or equal to 7.

When a determination result received from the judging unit JUD indicates that the brightness of an image is within the valid range, the setter SET sets an EV value calculated by the calculator CAL in the sensor ISEN. As a result, an image is captured by the sensor ISEN with an appropriate exposure (which imparts the target brightness to an image).

The configuration of the digital camera CAM is not limited to the example described above. For example, the judging unit JUD may be provided outside of (or separately from) the image processor ISP. Also, the signal processor SP may be configured to read different numbers of lines of image data in a time period before the image brightness becomes within the valid range and in a time period after an EV value corresponding to the target brightness is calculated. For example, the signal processor SP may be configured to read only a part of image data corresponding to lines in a middle portion of an image to calculate image brightness while the image brightness is not within the valid range. In this case, for example, the signal processor SP reads image data corresponding to the entire image in the time period after an EV value corresponding to the target brightness is calculated.

Figure 2:
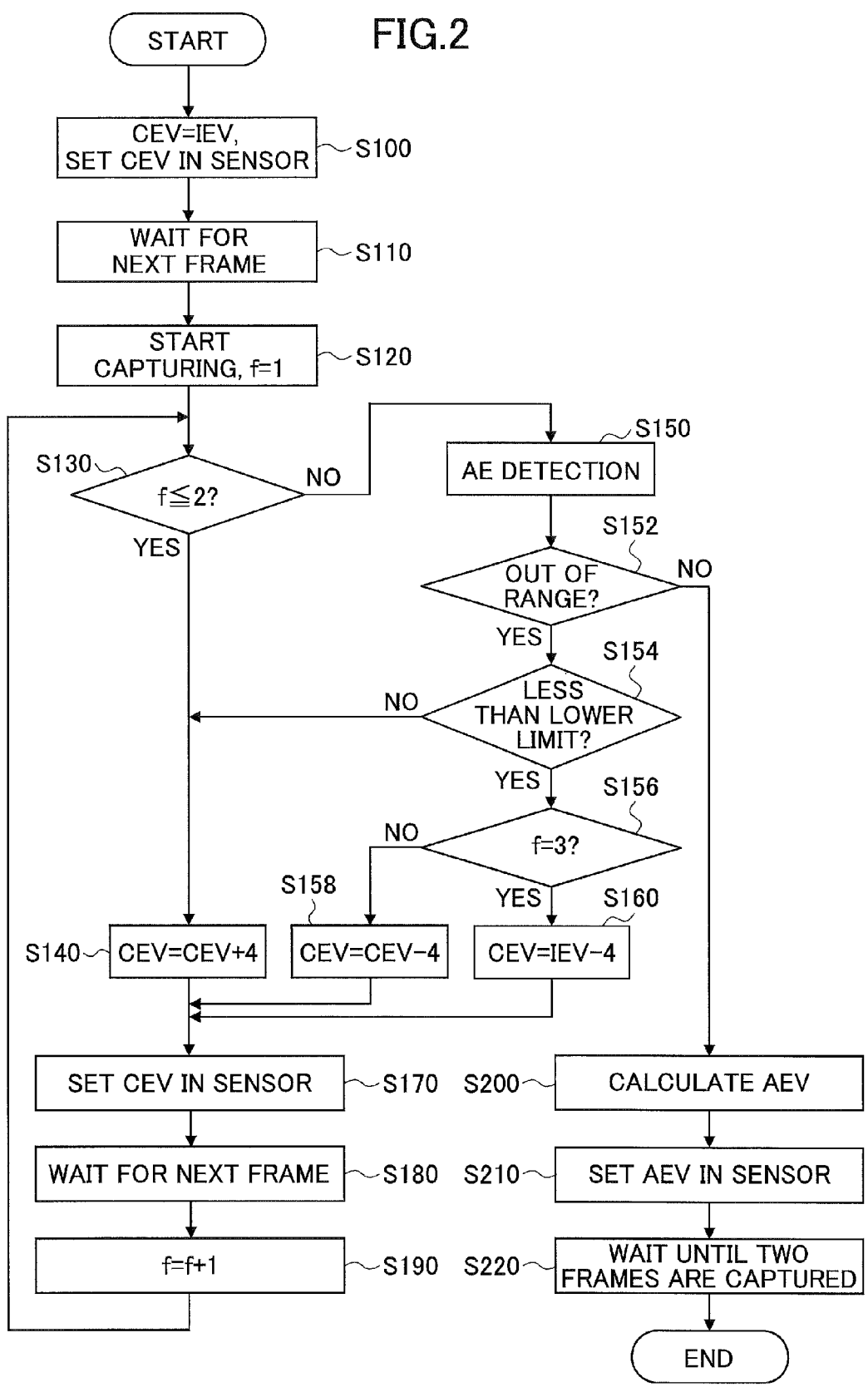
FIG. 2 is a flowchart illustrating an exemplary process performed by a digital camera.

FIG. 2 is a flowchart illustrating an exemplary process performed by the digital camera CAM of FIG. 1. The process of FIG. 2 may be performed solely by hardware or by controlling hardware with software. In the process of FIG. 2, it is assumed that the brightness of an image captured by the sensor ISEN is detected two frames later, and the adjustment amount is set at 4.

Step S100 is performed, for example, when the digital camera CAM is turned on. Also, step S100 may be performed when the operation mode of the digital camera CAM is changed to a shooting mode (a mode for capturing an image). That is, the process of FIG. 2 may be started when the digital camera CAM is turned on and/or when the operation mode of the digital camera CAM is changed to the shooting mode.

At step S100, the setter SET sets an exposure value CEV at an initial value IEV. Then, the setter SET sets the exposure value CEV (=initial value IEV) in the sensor ISEN.

At step S110, the digital camera CAM waits for the timing to start exposure of a next frame (first frame).

At step S120, the digital camera CAM starts image capturing. As a result, an image of the first frame is captured. Also, the digital camera CAM sets a flag f corresponding to a frame number at 1. Image capturing is continued at a predetermined frame rate even after step S120.

At step S130, the digital camera CAM determines whether the flag f is less than or equal to 2. Here, when the brightness of an image captured by the sensor ISEN is to be detected "m" frames later (m is a positive integer), the digital camera CAM determines whether the flag f is less than or equal to "m".

When the flag f is less than or equal to 2 (YES at step S130), the process of the digital camera CAM proceeds to step S140. In other words, in a frame period where the first or second frame is captured, the process of the digital camera CAM proceeds to step S140. On the other hand, when the flag f is greater than 2 (NO at step S130), the process of the digital camera CAM proceeds to step S150. In other words, in a frame period where the third or subsequent frame is captured, the process of the digital camera CAM proceeds to step S150.

At step S140, the setter SET increases the exposure value CEV by the adjustment amount (=4).

For example, the setter SET adds 4 (adjustment amount) to the current exposure value CEV. The increased exposure value CEV obtained by adding 4 (adjustment amount) to the current exposure value CEV is used to capture the next frame. Step S140 may instead be performed by the calculator CAL.

At step S150, the detecting unit DET performs AE detection of an (f−2)th frame. For example, the detecting unit DET calculates the brightness (image brightness) of an image of the (f−2)th frame based on image data of the (f−2)th frame. With this configuration, the brightness of an image of the (f−2)th frame is calculated while an f-th frame is being exposed.

At step S152, the judging unit JUD determines whether the brightness of the image calculated at step S150 is out of the valid range. When the brightness of the image is out of the valid range (YES at step S152), the process of the digital camera CAM proceeds to step S154. That is, when, for example, the output level of the sensor ISEN is saturated or insufficient, the process of the digital camera CAM proceeds to step S154.

On the other hand, when the brightness of the image is within the valid range (NO at step S152), the process of the digital camera CAM proceeds to step S200. That is, when an EV value that achieves image brightness within the valid range is found, the process of the digital camera CAM proceeds to step S200.

At step S154, the judging unit JUD determines whether the brightness of the image calculated at step S150 is less than the lower limit of the valid range. When the brightness of the image is less than the lower limit (YES at step S154), the process of the digital camera CAM proceeds to step S156. That is, when, for example, the output level of the sensor ISEN is insufficient, the process of the digital camera CAM proceeds to step S156.

On the other hand, when the brightness of the image is greater than or equal to the lower limit (NO at step S154), the process of the digital camera CAM proceeds to step S140. That is, when, for example, the output level of the sensor ISEN is saturated, the process of the digital camera CAM proceeds to step S140.

At step S156, the judging unit JUD determines whether the flag f is 3. Here, when the brightness of an image captured by the sensor ISEN is to be detected "m" frames later, the judging unit JUD determines whether the flag f is "m".

When the flag f is 3 (YES at step S156), the process of the digital camera CAM proceeds to step S160. That is, when a frame whose image brightness is less than the lower limit is the first frame, the process of the digital camera CAM proceeds to step S160. On the other hand, when the flag f is not 3 (NO at step S156), the process of the digital camera CAM proceeds to step S158. That is, when a frame whose image brightness is less than the lower limit is the second or subsequent frame, the process of the digital camera CAM proceeds to step S158.

At step S158, the setter SET decreases the exposure value CEV by the adjustment amount (=4). For example, the setter SET subtracts 4 (adjustment amount) from the current exposure value CEV. The decreased exposure value CEV obtained by subtracting 4 (adjustment amount) from the current exposure value CEV is used to capture the next frame. Step S158 may instead be performed by the calculator CAL.

At step S160, the setter SET sets the exposure value CEV at a value obtained by subtracting 4 (adjustment amount) from the initial value IEV. The exposure value CEV set at the value obtained by subtracting 4 (adjustment amount) from the initial value IEV is used to capture the next frame. Step S160 may instead be performed by the calculator CAL.

At step S170, the setter SET sets the exposure value CEV updated at one of steps S140, S158, and S160 in the sensor ISEN. For example, when the flag f is less than or equal to 2 or when the flag f is greater than or equal to 3 and image brightness is saturated, the setter SET sets the exposure value CEV updated at step S140 in the sensor ISEN. When the flag f is greater than or equal to 4 and image brightness is less than the lower limit, the setter SET sets the exposure value CEV updated at step S158 in the sensor ISEN.

When the flag f is 3 and image brightness is less than the lower limit, the setter SET sets the exposure value CEV updated at step S160 in the sensor ISEN. As a result, an (f+1)th frame is captured with the exposure value CEV updated at one of steps S140, S158, and S160.

At step S180, the digital camera CAM waits for the timing to start exposure of the next frame (the (f+1)th frame). For example, the digital camera CAM waits until the exposure of the f-th frame is completed.

At step S190, the digital camera CAM increments the flag f. For example, the digital camera CAM adds 1 to the current flag f. After step S190, the process of the digital camera CAM returns to step S130. As described above, the setter SET changes the exposure value CEV for each frame by the predetermined adjustment amount (4 in the example of FIG. 2) until image brightness becomes within the valid range. On the other hand, when image brightness becomes within the valid range (NO at step S152), the digital camera CAM performs step S200.

At step S200, the calculator CAL calculates an appropriate exposure value AEV based on the brightness of an image and an exposure value of the (f−2)th frame. For example, when the brightness of the image of the (f−2)th frame is $B_{f-2}$, the exposure value of the (f−2)th frame is $CEV_{f-2}$, and the target brightness is $B_{tg}$, the appropriate exposure value AEV is expressed by formula (1) below.

$$AEV = CEV_{f-2} + \log_2(B_{f-2}/B_{tg}) \qquad (1)$$

At step S210, the setter SET sets the exposure value AEV calculated at step S200 in the sensor ISEN. For example, the setter SET sets, in the sensor ISEN, an exposure value that is within a range of exposure values supported by the digital camera CAM and is closest to the exposure value AEV calculated at step S200. As a result, the (f+1)th frame is captured with an appropriate exposure value (e.g., the exposure value AEV calculated at step S200).

At step S220, the digital camera CAM waits until two frames subsequent to the (f+1)th frame are captured, and then proceeds to normal processing. That is, the (f+2)th frame and the (f+3)th frame are captured with the exposure value AEV set at step S210.

The process performed by the digital camera CAM is not limited to the example described above. For example, the digital camera CAM may be configured to perform steps S142 and S144 instead of step S140 illustrated in FIG. 11. Also, the digital camera CAM may be configured to determine whether the flag f is 1, 2, 3, or 4 or greater when it is determined at step S154 that the image brightness is greater than or equal to the lower limit (NO at step S154). In this case, for example, the digital camera CAM may be configured to perform step S144 (CEV=CEV+8) of FIG. 11 when the flag f is 1 or 3, to perform step S158 when the flag f is 2, and to perform step S140 when the flag f is 4 or greater.

Also, the setter SET may be configured to decrease the exposure value CEV by the adjustment amount at step S140, to increase the exposure value CEV by the adjustment amount at step S158, and to set the exposure value CEV at a value obtained by adding the adjustment amount to the initial value IEV. In this case, the judging unit JUD determines, at step S154, whether the image brightness is greater than the upper limit of the valid range. Also in this case, the digital camera CAM performs step S156 when the image brightness is greater than the upper limit of the valid range, and to decrease the exposure value CEV by the adjustment amount (CEV=CEV−4) when the image brightness is less than or equal to the upper limit of the valid range.

Figure 3:
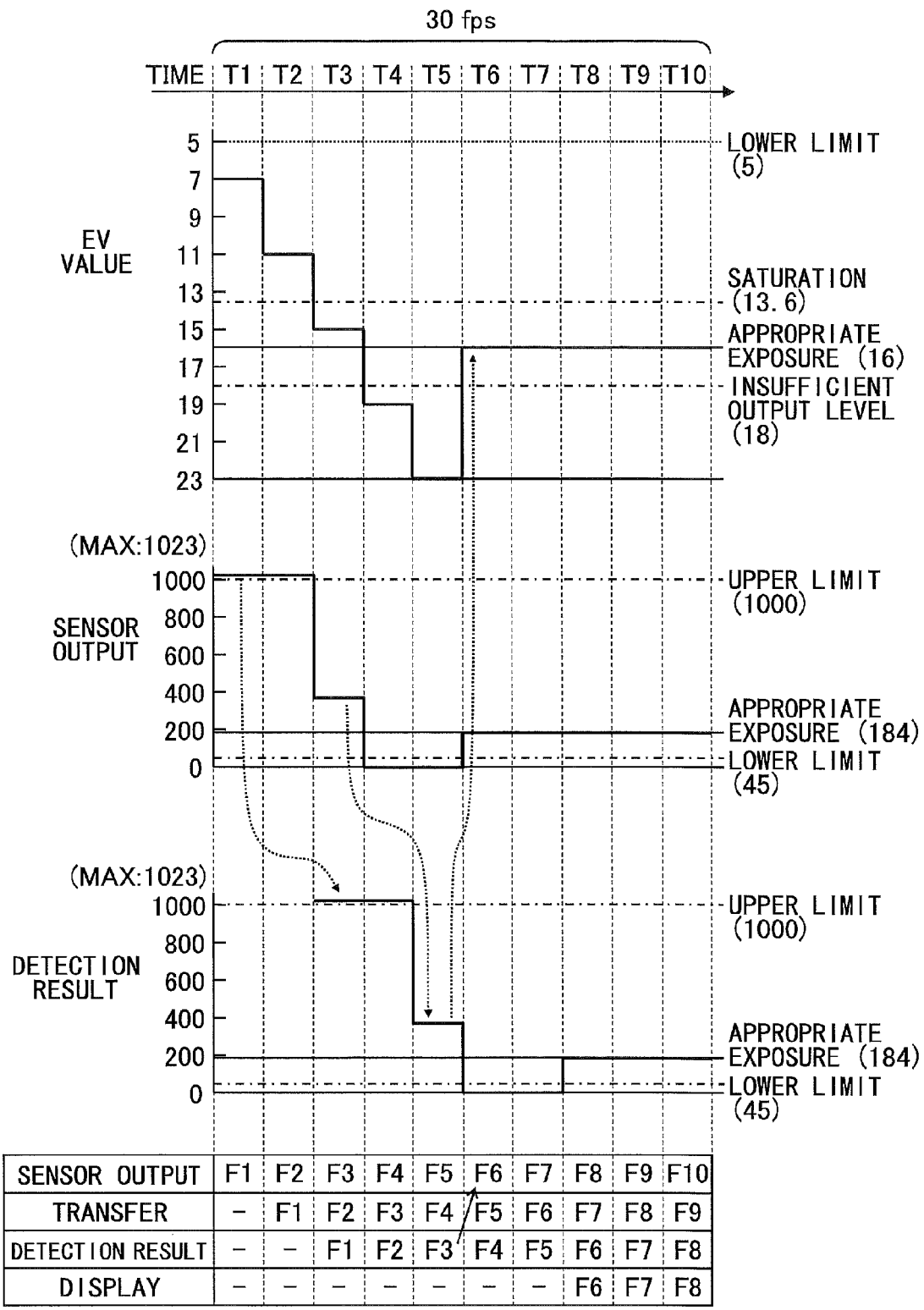
FIG. 3 is a graph illustrating exemplary exposure values that are set according to the process of FIG. 2.

FIG. 3 is a graph illustrating exemplary exposure values ("EV VALUE") that are set according to the process of FIG. 2. In FIG. 3, it is assumed that the initial value of the EV value (initial value IEV) is less than an exposure value with which the output of the sensor ISEN is saturated. In the example of FIG. 3, the initial value IEV is 7. Also in the example of FIG. 3, image data represented by an analog signal output from the sensor ISEN is converted into 10-bit digital data. In FIG. 3, "SENSOR OUTPUT" indicates the output of the sensor ISEN that is converted into image brightness. That is, in FIG. 3, the output of the sensor ISEN is represented by digital data obtained by A/D conversion. Also in FIG. 3, "DETECTION RESULT" indicates image brightness calculated by the detecting unit DET.

In the example of FIG. 3, the upper limit of the valid range is 1000, and the lower limit of the valid range is 45. Accordingly, the adjustment amount is set at 4 that is less than 4.474 ($\approx \log_2(1000/45)$). Also, the target brightness is set at 184 ($\approx 1023 \times 0.18$). Therefore, the digital camera CAM controls the exposure value so that the image brightness becomes about 184. That is, when an appropriate exposure value is set, the image brightness becomes about 184.

Further in the example of FIG. 3, the frame rate is 30 frames per second (fps). In this case, one frame period is about 33.3 ms. Each period T (T1-T10) in FIG. 3 corresponds to one frame period. The numeral in each of F1 through F10 in FIG. 3 indicates a frame number. For example, a frame F1 indicates the first frame.

The minimum EV value (the smallest value that can be set as an EV value) is, for example, 5. The initial value IEV is set at 7. For example, an EV value of 7 is used in an "indoor condition" where an image is captured indoors. Thus, the initial value IEV of an EV value to be changed for each frame F is set at a value that is greater than or equal to the minimum EV value ("5" in FIG. 3) and less than or equal to 7. When an image is to be captured indoors, setting the initial value IEV as described above makes it possible to start searching for an EV value corresponding to image brightness within the valid range, using a value close to an appropriate EV value. This in turn makes it possible to reduce the time necessary to find an EV value corresponding to image brightness within the valid range, and thereby makes it possible to reduce the time necessary to set an appropriate exposure after the digital camera CAM is turned on. In other words, when images are frequently captured indoors, the above setting makes it possible to effectively reduce the time necessary to set an appropriate exposure after the digital camera CAM is turned on.

As another example, an EV value of 11 is used in a "cloudy condition" where an image is captured under a cloudy sky. As another example, an EV value of 15 is used in a "clear-sky condition" where an image is captured under a clear sky or in a bright room. As still another example, an EV value of 19 is used in a "clear-snow-scene condition" where an image is captured in an extremely bright condition such as a snow scene under a clear sky. In FIG. 3, it is assumed that an image is captured in a condition close to the clear-sky condition.

In the period T1, the EV value is initialized to 7, and the first frame F1 is exposed. As a result, image data of the frame F1 is output from the sensor ISEN. When the EV value is set at 7, the output of the sensor ISEN is saturated (i.e., greater than the upper limit of 1000). In the period T1, transfer of the image data of the frame F1 to the image processor ISP has not been completed. Accordingly, in the next period T2, the EV value is set at a value obtained by adding 4 (the adjustment amount) to the current EV value (=7).

In the period T2, the EV value is set at 11 (=7+4), and the second frame F2 is exposed. As a result, image data of the frame F2 is output from the sensor ISEN. When the EV value is set at 11, the output of the sensor ISEN is still saturated (i.e., greater than the upper limit of 1000). Also in the period T2, the image data of the frame F1 is transferred to the image processor ISP. In the period T2, however, detection of the image data of the frame F1 has not been completed. Accordingly, in the next period T3, the EV value is set at a value obtained by adding 4 (the adjustment amount) to the current EV value (=11).

In the period T3, the EV value is set at 15 (=11+4), and the third frame F3 is exposed. As a result, image data of the frame F3 is output from the sensor ISEN. When the EV value is set at 15, the output of the sensor ISEN is about 368 that is between the upper limit of 1000 and the lower limit of 45. Also in the period T3, the image data of the frame F2 is transferred to the image processor ISP. Further in the period T3, image brightness of the frame F1 is calculated (i.e., detection of the image data of the frame F1 is performed). The image brightness of the frame F1 is saturated (i.e., greater than the upper limit of 1000). Accordingly, in the next period T4, the EV value is set at a value obtained by adding 4 (the adjustment amount) to the current EV value (=15).

In the period T4, the EV value is set at 19 (=15+4), and the fourth frame F4 is exposed. As a result, image data of the frame F4 is output from the sensor ISEN. When the EV value is set at 19, the output of the sensor ISEN is less than the lower limit of 45. Also in the period T4, the image data of the frame F3 is transferred to the image processor ISP. Further in the period T4, image brightness of the frame F1 is calculated (i.e., detection of the image data of the frame F2 is performed). The image brightness of the frame F2 is saturated (i.e., greater than the upper limit of 1000). Accordingly, in the next period T5, the EV value is set at a value obtained by adding 4 (the adjustment amount) to the current EV value (=19).

In the period T5, the EV value is set at 23 (=19+4), and the fifth frame F5 is exposed. As a result, image data of the frame F5 is output from the sensor ISEN. When the EV value is set at 23, the output of the sensor ISEN is less than the lower limit of 45. Also in the period T5, the image data of the frame F4 is transferred to the image processor ISP. Further in the period T5, image brightness of the frame F3 is calculated (i.e., detection of the image data of the frame F3 is performed). The image brightness of the frame F3 is about 368 (which corresponds to the output of the sensor ISEN in the period T3) that is between the upper limit of 1000 and the lower limit of 45. Accordingly, the EV value to be set in the next period T6 is calculated based on the EV value (=15) used to expose the frame F3, the image brightness (about 368) of the frame F3, and the target brightness (about 184). That is, an EV value (appropriate EV value) corresponding to the target brightness is calculated.

In the period T6, the EV value is set at 16 (=15+$\log_2$(368/184)), and the sixth frame F6 is exposed. As a result, image data of the frame F6 is output from the sensor ISEN. Thus, in the period T6, an appropriate EV value calculated based on the detection result of the frame F3 is set in the sensor ISEN.

When the EV value is set at 16, the output of the sensor ISEN is about 184 that corresponds to the target brightness (appropriate exposure). Also in the period T6, the image data of the frame F5 is transferred to the image processor ISP. Because a detection result available in the period T6 represents the image brightness of the frame F4 exposed before the appropriate EV value is set, the detection result is not used to calculate the EV value for the next period T7. Accordingly, in the next period T7, the EV value is maintained at the current EV value (=16).

In the period T7, the EV value is maintained at 16, and the seventh frame F7 is exposed. As a result, image data of the frame F7 is output from the sensor ISEN. When the EV value is set at 16, the output of the sensor ISEN is about 184 (target brightness). Also in the period T7, the image data of the frame F6 is transferred to the image processor ISP. Because a detection result available in the period T7 represents the image brightness of the frame F5 exposed before the appropriate EV value is set, the detection result is not used to calculate the EV value for the next period T8. Accordingly, in the next period T8, the EV value is maintained at the current EV value (=16).

In the period T8, the EV value is maintained at 16, and the eighth frame F8 is exposed. As a result, image data of the frame F8 is output from the sensor ISEN. When the EV value is set at 16, the output of the sensor ISEN is about 184

(target brightness). Also in the period T8, the image data of the frame F7 is transferred to the image processor ISP.

Further in the period T8, image brightness of the frame F6 exposed with the appropriate EV value is calculated. The image brightness of the frame F6 is about 184 (target brightness). Accordingly, the EV value to be set in the next period T9 is calculated based on the EV value (=16) used to expose the frame F6 and the image brightness (about 184) of the frame F6. Thus, in and after the period T8, normal processing is performed. Also in the period T8, because transfer of the image data of the frame F6 to the image processor ISP has been completed in the period T7, an image of the frame F6 is displayed on a display.

Thus, according to the embodiment of FIG. 3, the digital camera CAM can set an appropriate EV value in and after the period T6. In this case, the digital camera CAM can display images on the display in and after the period T8. According to the embodiment of FIG. 3, the time necessary to set an appropriate EV value after the digital camera CAM is turned on is about 166.5 ms (=33.3 ms×5=about 5 frame periods). Also according to the embodiment of FIG. 3, the time necessary to display an image on the display after the digital camera CAM is turned on is about 233.1 ms (=33.3 ms×7=about 7 frame periods).

In the embodiment of FIG. 3, an EV value corresponding to image brightness within the valid range is searched for by simply increasing the EV value by the adjustment amount (=4). When an EV value corresponding to image brightness within the valid range is searched for by simply increasing or decreasing the EV value by the adjustment amount and the adjustment amount is less than or equal to $\log_2$ (upper limit/lower limit), it is possible to improve the search efficiency by increasing the adjustment amount.

For example, when the adjustment amount is 2, the EV value is set at 13 (=7+2+2+2) in the period T4. When the EV value is set at 13, the output of the sensor ISEN is saturated (i.e., greater than the upper limit of 1000). Accordingly, the EV value is set at 15 (=13+2) in the period T5. When the EV value is set at 15, the output of the sensor ISEN is about 368 that corresponds to image brightness within the valid range.

On the other hand, as described above, when the adjustment amount is 4, the EV value is set at 15 in the period T3. Thus, compared to a case where the adjustment amount is set at 2, setting the adjustment amount at 4 makes it possible to reduce the time necessary to find an EV value corresponding to image brightness within the valid range. This in turn makes it possible to reduce the time taken by the digital camera CAM to set an appropriate exposure after start-up, and thereby makes it possible to reduce the time taken by the digital camera CAM to display an image on the display after start-up.

When the adjustment amount is greater than $\log_2$ (upper limit/lower limit), it may be not possible to find an EV value corresponding to image brightness within the valid range. For example, when the adjustment amount is 6, the EV value is set at 7, 13, and 19 in the periods T1, T2, and T3, respectively. In this case, the outputs of the sensor ISEN in the periods T1 and T2 are saturated, the output of the sensor ISEN in the period T3 becomes less than the lower limit, and an EV value corresponding to image brightness within the valid range cannot be found.

On the other hand, in the embodiment of FIG. 3, the adjustment amount is set at 4 that is less than $\log_2(1000/45)$. With the adjustment amount set at 4, the digital camera CAM can efficiently find an EV value corresponding to image brightness within the valid range.

Figure 4:
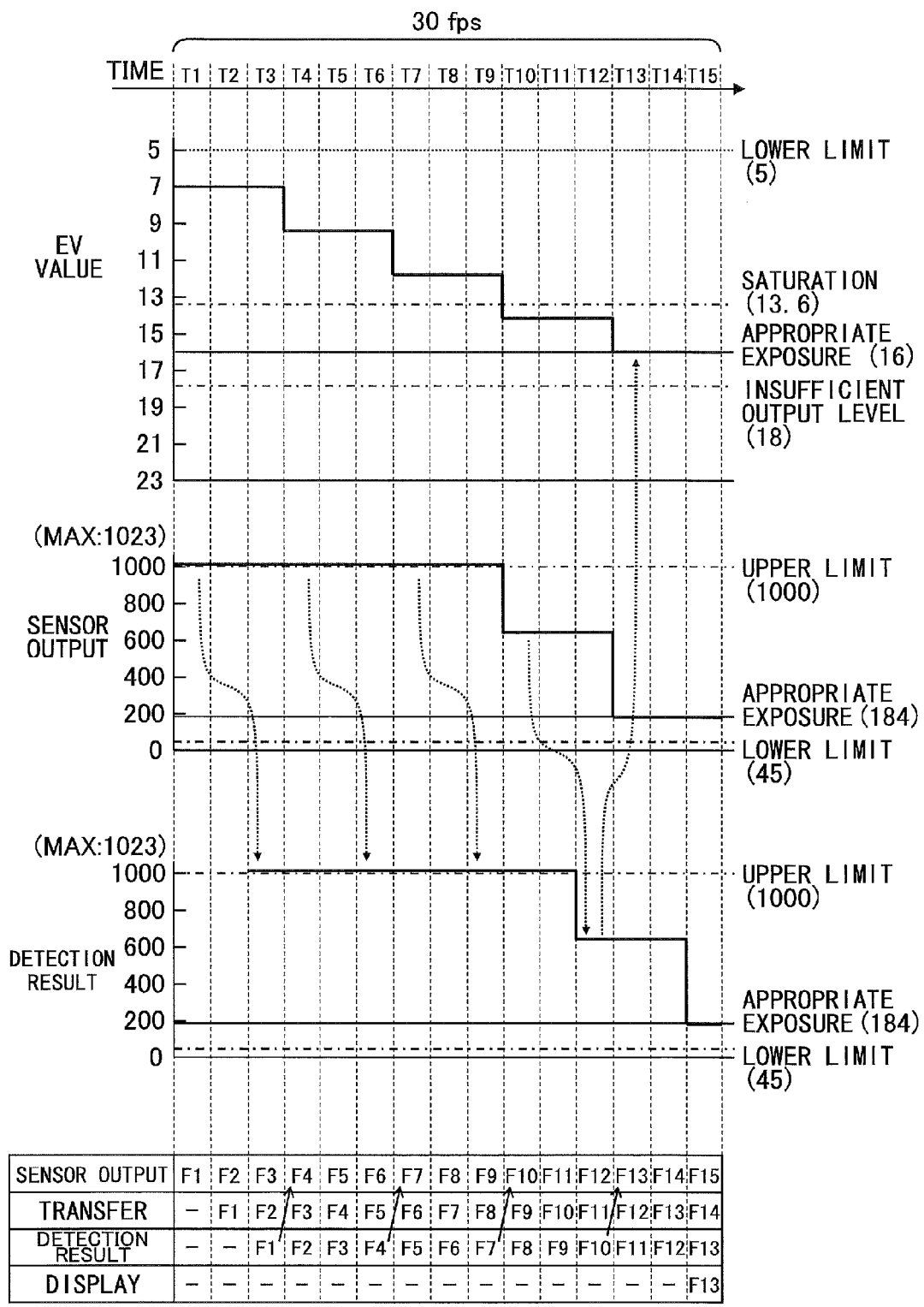
FIG. 4 is a graph illustrating exposure values that are set according to a comparative example.

FIG. 4 is a graph illustrating exposure values that are set according to a comparative example. In FIG. 4, it is assumed that the initial value of the EV value (initial value IEV) is less than an exposure value with which the output of the sensor ISEN is saturated. In the example of FIG. 4, the initial value IEV is 7. The meanings of legends and reference numbers and the condition for capturing an image in FIG. 4 are substantially the same as those used in FIG. 3. Detailed descriptions of operations that are substantially the same as those in FIG. 3 are omitted here. In the comparative example of FIG. 4, the EV value is calculated based on detection results even in the periods T1 through T12 where the detection results are still not within the valid range. Accordingly, in the comparative example of FIG. 4, the EV value is not updated until image brightness is calculated.

In the period T1, the EV value is initialized to 7, and the first frame F1 is exposed. Because image brightness of the frame F1 is calculated in the period T3, the EV value is maintained at 7 in the periods T2 and T3. The image brightness of the frame F1 calculated in the period T3 is saturated (i.e., greater than the upper limit of 1000). Therefore, the EV value to be set in the period T4 is calculated based on the image brightness 1000 of the frame F1. For example, the EV value to be set in the period T4 is calculated based on the EV value (=7) used to expose the frame F1, the image brightness (1000) of the frame F1, and the target brightness (about 184).

In the period T4, the EV value is set at 9.4 ($\approx 7+\log_2(1000/184)$). Because image brightness of the frame F4 is calculated in the period T6, the EV value is maintained at 9.4 in the periods T5 and T6. The image brightness of the frame F4 calculated in the period T6 is saturated (i.e., greater than the upper limit of 1000). Therefore, the EV value to be set in the period T7 is calculated based on the image brightness 1000 of the frame F4.

In the period T7, the EV value is set at 11.8 ($\approx 9.4+\log_2(1000/184)$). Because image brightness of the frame F7 is calculated in the period T9, the EV value is maintained at 11.8 in the periods T8 and T9. The image brightness of the frame F7 calculated in the period T9 is saturated (i.e., greater than the upper limit of 1000). Therefore, the EV value to be set in the period T10 is calculated based on the image brightness 1000 of the frame F7.

In the period T10, the EV value is set at 14.2 ($\approx 11.8+\log_2(1000/184)$). Because image brightness of the frame F10 is calculated in the period T12, the EV value is maintained at 14.2 in the periods T11 and T12. The image brightness of the frame F10 calculated in the period T12 is about 640 that is between the upper limit of 1000 and the lower limit of 45. Accordingly, the EV value to be set in the period T13 is calculated based on the EV value (=14.2) used to expose the frame F10, the image brightness (about 640) of the frame F10, and the target brightness (about 184).

In the period T13, the EV value is set at 16 (=14.2+$\log_2$(640/184)) that is an appropriate EV value. Image data of the frame F13 exposed with the appropriate EV value is transferred to the image processor ISP in the period T14. As a result, in the period T15, an image of the frame F13 is displayed on the display.

Thus, according to the comparative example, the digital camera CAM can set an appropriate EV value in and after the period T13. In this case, the digital camera CAM can display images on the display in and after the period T15. According to the comparative example, the time necessary to set an appropriate EV value after the digital camera CAM is turned on is about 399.6 ms (=33.3 ms×12=about 12 frame periods). Also according to the comparative example, the time necessary to display an image on the display after the digital camera CAM is turned on is about 466.2 ms (=33.3 ms×14=about 14 frame periods).

When an adjustment amount of 4, which is used in FIG. 3, is also used in the comparative example of FIG. 4 to calculate an EV value for the next period T while the detection result is saturated, the EV values set in the periods T1, T4, and T7 become 7, 11 (=7+4), and 15 (=11+4), respectively. In this case, the time necessary to set an appropriate EV value after the digital camera CAM is turned on is about 299.7 ms (=33.3 ms×9=about 9 frame periods).

On the other hand, according to the embodiment of FIG. 3, the time necessary to set an appropriate EV value after the digital camera CAM is turned on is about 166.5 ms (=33.3 ms×5=about 5 frame periods). Accordingly, compared with the comparative example of FIG. 4, the embodiment of FIG. 3 makes it possible to reduce the time necessary to set an appropriate EV value after the digital camera CAM is turned on. Also, compared with the comparative example of FIG. 4, the embodiment of FIG. 3 makes it possible to reduce the time necessary to display an image on the display after the digital camera CAM is turned on.

As described above, with a digital camera and an exposure control method of the embodiment illustrated by FIGS. 1 through 3, the setter SET changes the exposure value for each frame F by a predetermined adjustment amount until the brightness of an image captured by the sensor ISEN becomes within the valid range. When image brightness becomes within the valid range, the calculator CAL calculates an exposure value corresponding to the target brightness level based on the image brightness.

The adjustment amount may be determined in advance based on, for example, a difference between an exposure value corresponding to the lower limit of the valid range and an exposure value corresponding to the upper limit of the valid range. For example, the adjustment amount may be determined at a maximum value that is less than or equal to $\log_2$ (upper limit/lower limit) and that does not complicate a control process for changing the EV value. Setting the adjustment amount in this manner makes it possible to efficiently find an EV value corresponding to image brightness within the valid range. Thus, the present embodiment makes it possible to reduce the time taken by the digital camera CAM to set an appropriate exposure after start-up, and thereby makes it possible to reduce the time taken by the digital camera CAM to display an image on the display after start-up.

Figure 5:
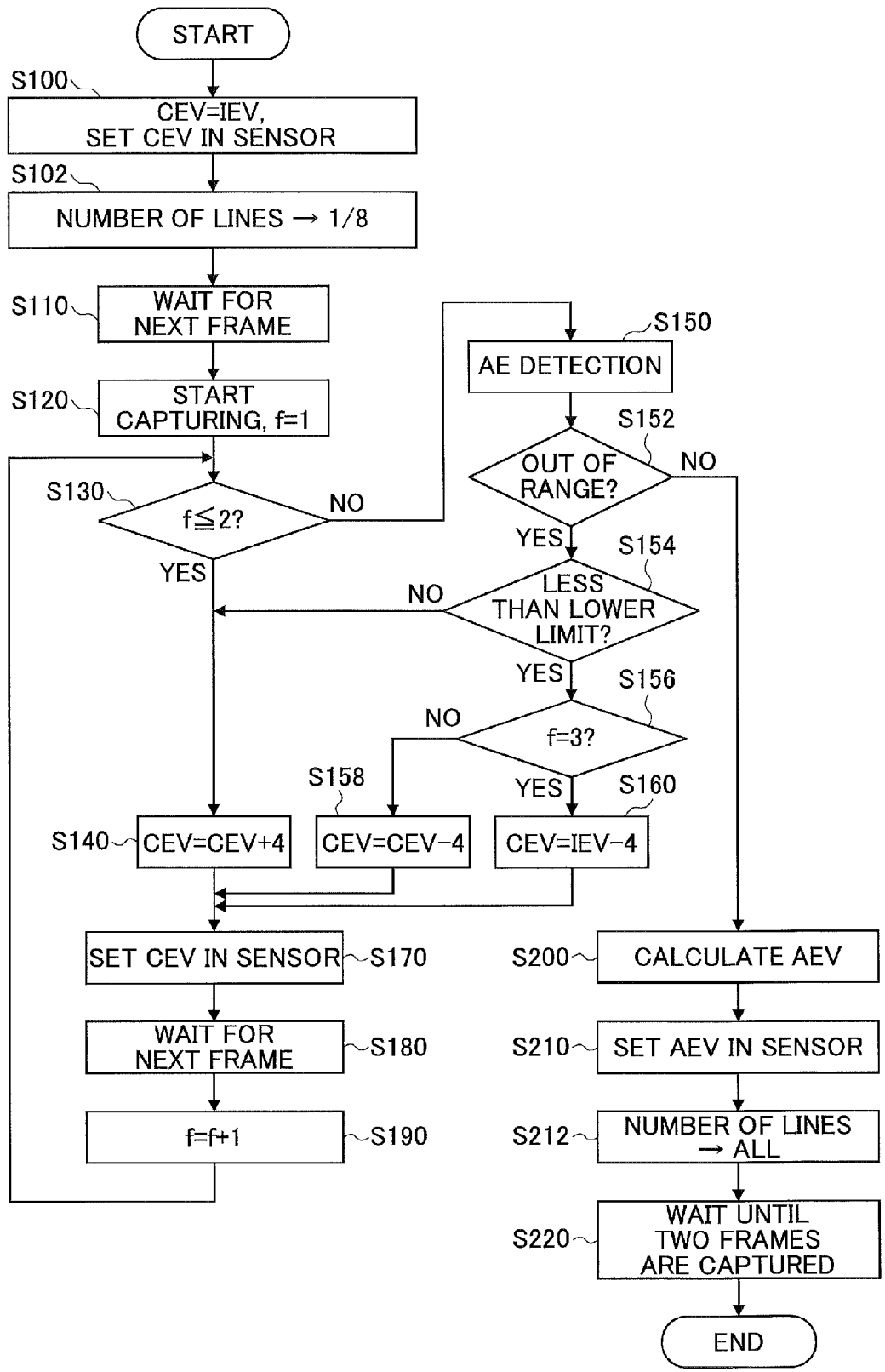
FIG. 5 is a flowchart illustrating another exemplary process performed by a digital camera.

FIG. 5 is a flowchart illustrating another exemplary process performed by the digital camera CAM of FIG. 1. In other words, FIG. 5 illustrates an exposure control method of the digital camera CAM according to an embodiment. In FIG. 5, steps S102 and S212 are added to the process of FIG. 2. For example, step S102 is performed after step S100 and before step S110, and step S212 is performed after step S210 and before step S220. Other steps in FIG. 5 are substantially the same as the corresponding steps in FIG. 2. Detailed descriptions of steps that are substantially the same as those in FIG. 2 are omitted here. The process of FIG. 5 may be started when the digital camera CAM is turned on and/or when the operation mode of the digital camera CAM is changed to a shooting mode (a mode for capturing an image). The process of FIG. 5 may be performed solely by hardware or by controlling hardware with software.

Step S100 of FIG. 5 is substantially the same as step S100 of FIG. 2. At step S100, the setter SET sets an exposure value CEV at an initial value IEV. Then, the setter SET sets the exposure value CEV (=initial value IEV) in the sensor ISEN.

At step S102, the digital camera CAM sets the number of lines of image data to be read (which may be hereafter referred to as "the number of target lines") at one eighth (⅛) of the number of lines of image data to be read when the image data is captured with an appropriate EV value. For example, the digital camera CAM determines lines in a middle portion (⅛ of all lines) of an image captured by the sensor ISEN as target lines to be read. In this case, the signal processor SP reads image data corresponding to lines in a middle portion (⅛ of all lines) of an image captured by the sensor ISEN for each frame F.

With this method, the number of target lines decreases, and therefore the time necessary to read image data is reduced. That is, with the embodiment of FIG. 5, it is possible to increase the frame rate. For example, when the frame rate is 30 fps after an appropriate EV value is set, the digital camera CAM increases the frame rate to 240 fps by reading only one eighth of all lines.

The number of target lines is not limited to one eighth of all lines. When the number of target lines is 1/k of all lines, the frame rate becomes k times greater than the frame rate in normal processing where all lines of image data are read.

Steps S110 through S210 of FIG. 5 are substantially the same as steps S110 through S210 of FIG. 2. For example, the digital camera CAM changes the exposure value CEV for each frame by the predetermined adjustment amount (4 in the example of FIG. 5) until the brightness of an image captured by the sensor ISEN becomes within the valid range. When image brightness becomes within the valid range, the digital camera CAM calculates an appropriate exposure value AEV corresponding to the target brightness based on the image brightness, and sets the appropriate exposure value AEV in the sensor ISEN.

According to the embodiment of FIG. 5, until the image brightness becomes within the valid range, the signal processor SP reads image data corresponding to lines in a middle portion of an image (i.e., lines set at step S102) for each frame F. Then, after the appropriate exposure value AEV corresponding to the target brightness is calculated, the signal processor SP reads image data corresponding to the entire image (i.e., lines set at step S212).

At step S212, for example, the digital camera CAM sets the number of target lines at "All". Thus, after the appropriate exposure value AEV corresponding to the target brightness is calculated, the signal processor SP reads image data corresponding to, for example, all lines of an image captured by the sensor ISEN for each frame F.

Here, the digital camera CAM captures images without changing the drive mode of the sensor ISEN in a time period before the image brightness becomes within the valid range and in a time period after the appropriate exposure value AEV corresponding to the target brightness is calculated. For example, the digital camera CAM drives the sensor ISEN in the full pixel mode where an image is captured without skipping pixels even in a time period before the image brightness becomes within the valid range.

Accordingly, the embodiment of FIG. 5 makes it possible to change frame rates without changing the drive mode of the sensor ISEN (e.g., without changing the drive mode from a high-speed mode where pixels are skipped to a normal full pixel mode), and thereby makes it possible to prevent a processing delay caused by changing the drive mode. Step S220 of FIG. 5 is substantially the same as step S220 of FIG.

2. The process performed by the digital camera CAM is not limited to the example described above.

Figure 6:
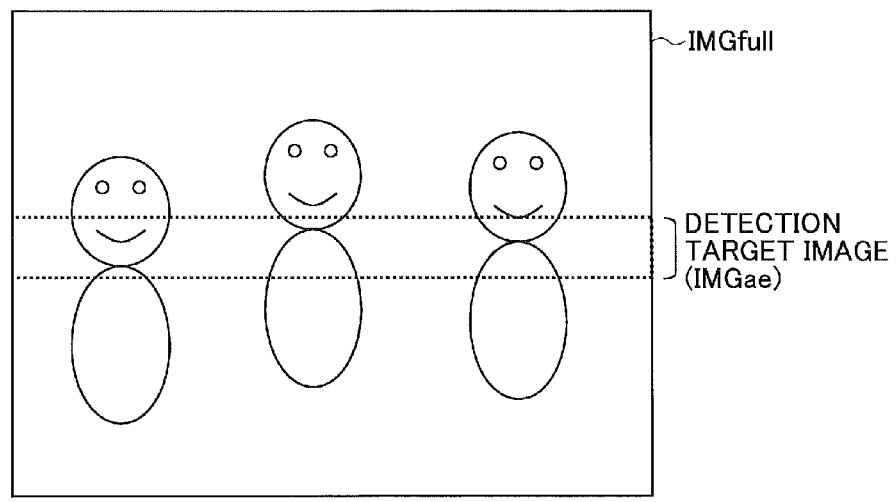
FIG. 6 is a drawing illustrating an exemplary detection target image.

FIG. 6 is a drawing illustrating an exemplary detection target image IMGae. The detection target image IMAGae corresponds, for example, to lines in a middle portion (which is surrounded by a dotted line in FIG. 6) of a full-size image IMGful.

The digital camera CAM captures images without changing the drive mode of the sensor ISEN in a time period before the image brightness becomes within the valid range and in a time period after an appropriate exposure value corresponding to the target brightness is calculated. That is, the digital camera captures the full-size image IMGfull even in a time period before the image brightness becomes within the valid range. In the time period before the image brightness becomes within the valid range, however, the signal processor SP reads only a part of image data corresponding to the detection target image IMGae that corresponds to lines in a middle portion (which is surrounded by a dotted line in FIG. 6) of the full-size image IMGfull. This configuration makes it possible to reduce the time taken by the signal processor SP to read image data.

Figure 7:
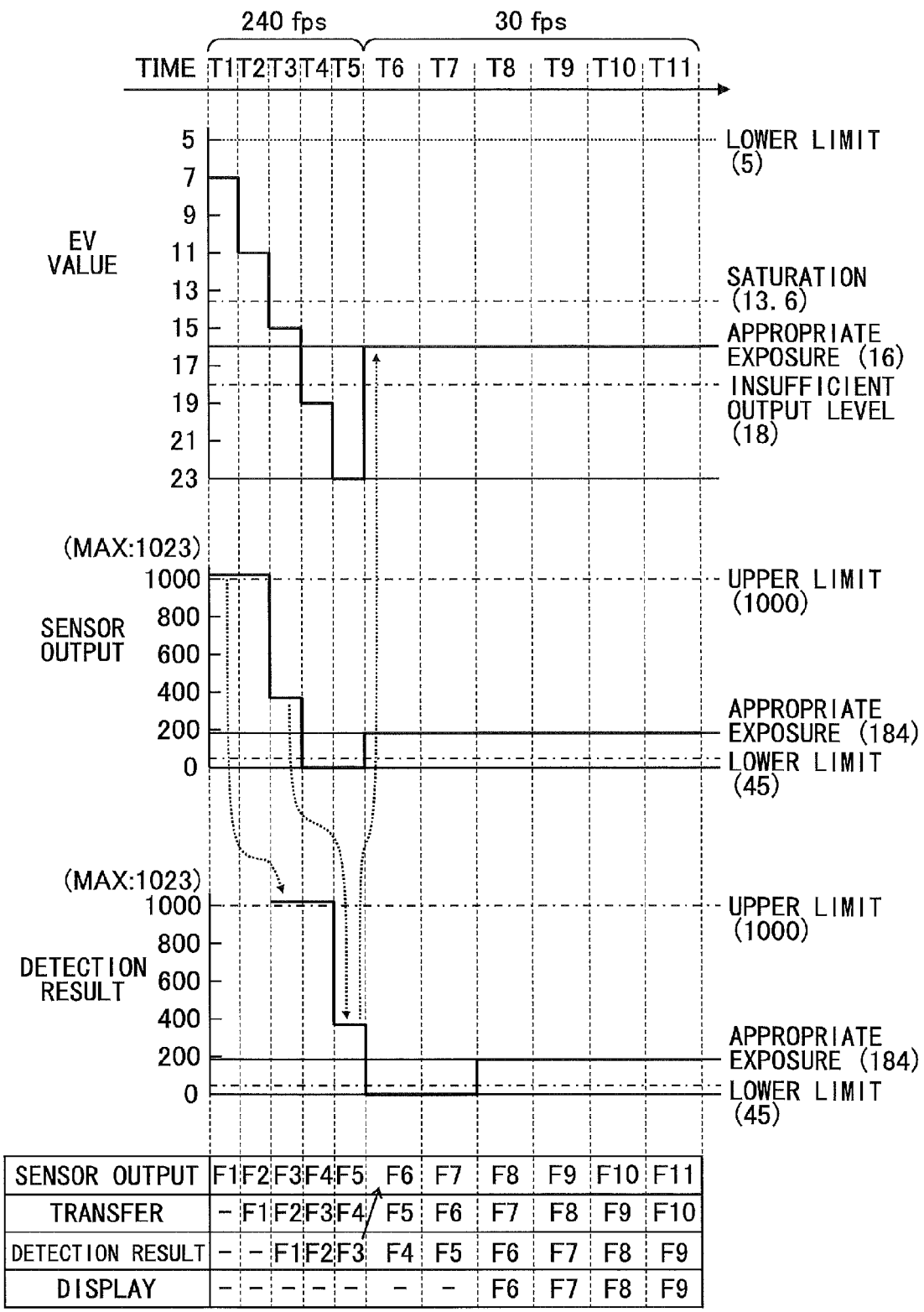
FIG. 7 is a graph illustrating exemplary exposure values that are set according to the process of FIG. 5.

FIG. 7 is a graph illustrating exemplary exposure values that are set according to the process of FIG. 5. In FIG. 7, it is assumed that the initial value of the EV value (initial value IEV) is less than an exposure value with which the output of the sensor ISEN is saturated. In the example of FIG. 7, the initial value IEV is 7. The meanings of legends and reference numbers and the condition for capturing an image in FIG. 7 are substantially the same as those of FIG. 3. Detailed descriptions of operations that are substantially the same as those in FIG. 3 may be omitted.

In FIG. 7, in the periods T1 through T5 before a detection result becomes within the valid range, the signal processor SP reads image data corresponding to lines in a middle portion (⅛ of all lines) of an image captured by the sensor ISEN for each frame F. In this case, assuming that the frame rate in and after the period T6 is 30 fps, the frame rate in the periods T1 through T5 becomes 240 fps (=30×8 fps). That is, in the periods T1 through T5, one frame period is about 4.2 ms.

In the period T1, the number of lines of image data to be read is set at one eighth (⅛) of all lines, and the EV value is initialized to 7. Then, the first frame F1 is exposed, and image data of the frame F1 is output from the sensor ISEN. The output of the sensor ISEN in the period T1 is saturated (i.e., greater than the upper limit of 1000). The signal processor SP reads image data corresponding to one eighth (⅛) of all lines from the sensor ISEN. The image data (corresponding to ⅛ of all lines) read by the signal processor SP is transferred to the image processor ISP in the next period T2. Thus, the digital camera CAM operates at a frame rate of 240 fps (=30×8 fps).

In the period T2, the EV value is set at 11 (=7+4), and the second frame F2 is exposed. As a result, image data (corresponding to ⅛ of all lines) of the frame F2 is output from the sensor ISEN. The output of the sensor ISEN in the period T2 is saturated (i.e., greater than the upper limit of 1000). Also in the period T2, the image data (corresponding to ⅛ of all lines) of the frame F1 is transferred to the image processor ISP.

In the period T3, the EV value is set at 15 (=11+4), and the third frame F3 is exposed. As a result, image data (corresponding to ⅛ of all lines) of the frame F3 is output from the sensor ISEN. The output of the sensor ISEN in the period T3 is about 368 that is between the upper limit of 1000 and the lower limit of 45. Also in the period T3, the image data (corresponding to ⅛ of all lines) of the frame F2 is transferred to the image processor ISP. Further in the period T3, image brightness of the frame F1 is calculated. The image brightness of the frame F1 is saturated (i.e., greater than the upper limit of 1000).

In the period T4, the EV value is set at 19 (=15+4), and the fourth frame F4 is exposed. As a result, image data (corresponding to ⅛ of all lines) of the frame F4 is output from the sensor ISEN. The output of the sensor ISEN in the period T4 is less than the lower limit of 45. Also in the period T4, the image data (corresponding to ⅛ of all lines) of the frame F3 is transferred to the image processor ISP. Further in the period T4, image brightness of the frame F2 is calculated.

The image brightness of the frame F2 is saturated (i.e., greater than the upper limit of 1000).

In the period T5, the EV value is set at 23 (=19+4), and the fifth frame F5 is exposed. As a result, image data (corresponding to ⅛ of all lines) of the frame F5 is output from the sensor ISEN. The output of the sensor ISEN in the period T5 is less than the lower limit of 45. Also in the period T5, the image data (corresponding to ⅛ of all lines) of the frame F4 is transferred to the image processor ISP.

Further in the period T5, image brightness of the frame F3 is calculated. The image brightness of the frame F3 is about 368 that is between the upper limit of 1000 and the lower limit of 45. Accordingly, the EV value to be set in the next period T6 is calculated based on the EV value (=15) used to expose the frame F3, the image brightness (about 368) of the frame F3, and the target brightness (about 184). That is, an EV value (appropriate EV value) corresponding to the target brightness is calculated.

Also, because the EV value corresponding to the target brightness is calculated, the number of lines of image data to be read in the next period T6 is set at "All". Accordingly, the digital camera CAM operates at a frame rate of 240 fps in the periods T1 through T5, and operates at a frame rate of 30 fps in and after the period T6.

In the period T6, the number of lines of image data to be read is set at "All", and the EV value is set at 16 (=15+log$_2$(368/184)). Then, the sixth frame F6 is exposed. As a result, image data of the frame F6 is output from the sensor ISEN. The signal processor SP reads all lines of image data from the sensor ISEN. The image data (all lines) read by the signal processor SP is transferred to the image processor ISP in the next period T7. With the EV value set at 16, the output of the sensor ISEN is about 184 that corresponds to the target brightness (appropriate exposure).

Thus, in the period T6, an appropriate EV value calculated based on the detection result of the frame F3 is set in the sensor ISEN, and the entire image data (all lines) is output from the sensor ISEN. That is, in and after the period T6, the digital camera CAM operates at a frame rate of 30 fps. In the embodiment of FIG. 7, the frame rate is changed in the period T6 without changing the drive mode of the sensor ISEN. Accordingly, the embodiment of FIG. 7 makes it possible to prevent a processing delay caused by changing the drive mode of the sensor ISEN.

Operations of the digital camera CAM in and after the period T7 of FIG. 7 are substantially the same as those of FIG. 3. For example, in the period T8, an image of the frame F6 is displayed on the display.

Thus, according to the embodiment of FIG. 7, the digital camera CAM can operate at a frame rate (240 fps) higher than the frame rate in a normal operation (in and after the period T6) until an appropriate EV value is set (in the periods T1 through T5). Thus, compared with the embodiment of FIG. 3, the embodiment of FIG. 7 makes it possible to reduce the time taken by the digital camera CAM to set an appropriate exposure after start-up, and thereby makes it possible to reduce the time taken by the digital camera CAM to display an image on the display after start-up.

For example, according to the embodiment of FIG. 7, the time necessary to set an appropriate EV value after the digital camera CAM is turned on is about 21 ms (=4.2 ms×5=about 5 frame periods). Also according to the embodiment of FIG. 7, the digital camera CAM can display images on the display in and after the period T8. In this case, the time necessary to display an image on the display after the digital camera CAM is turned on is substantially the same as the sum of five frame periods in a frame rate of 240 fps and two frame periods in a frame rate of 30 fps. That is, the time necessary to display an image on the display after the digital camera CAM is turned on is about 87.6 ms (=4.2 ms×5+33.3 ms×2).

Figure 8:
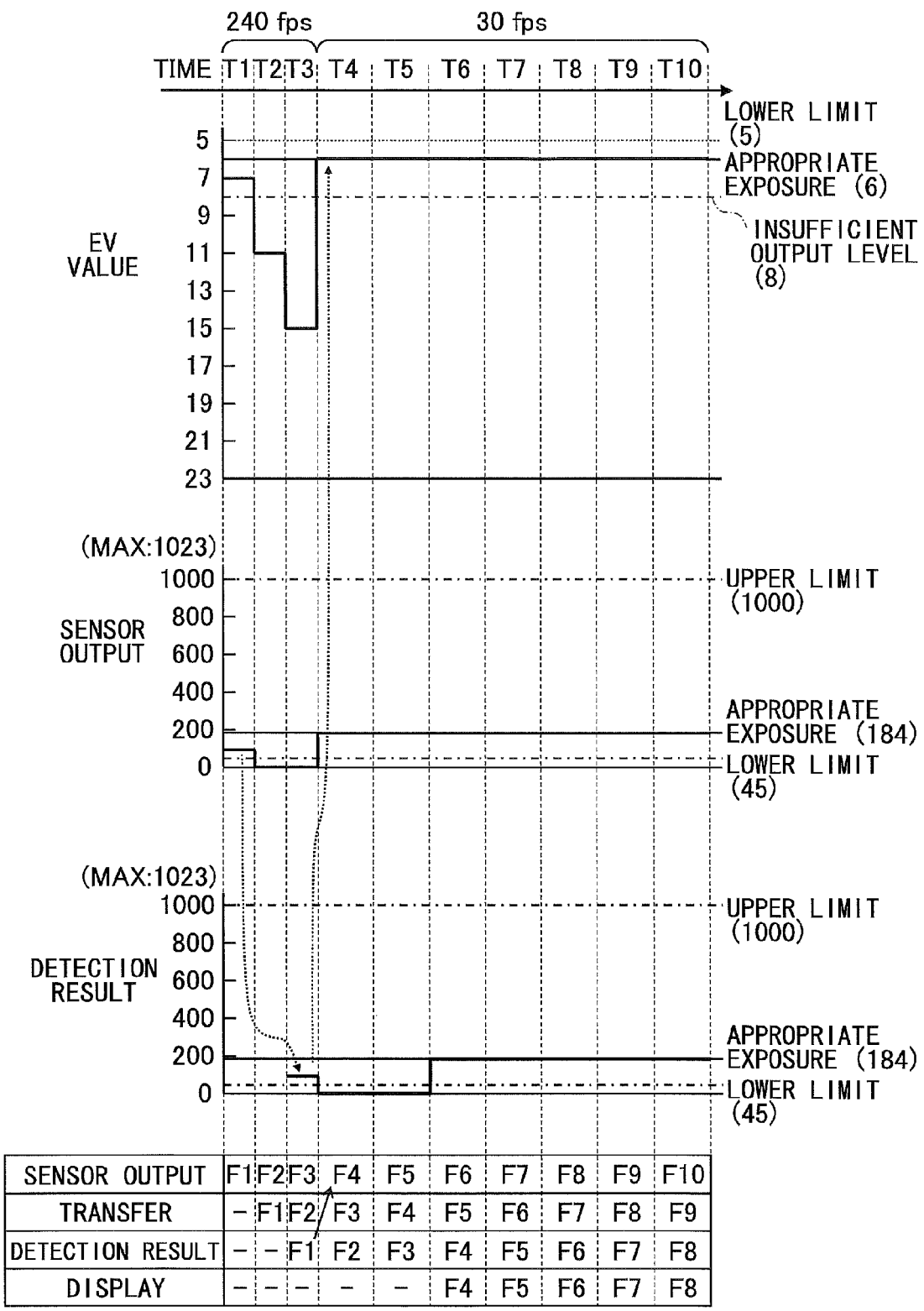
FIG. 8 is a graph illustrating other exemplary exposure values that are set according to the process of FIG. 5.

FIG. 8 is a graph illustrating other exemplary exposure values that are set according to the process of FIG. 5. In FIG. 8, it is assumed that the initial value of the EV value (initial value IEV) is greater than or equal to an exposure value with which the output of the sensor ISEN is saturated and is less than an exposure value with which the output of the sensor ISEN becomes insufficient. In the example of FIG. 8, the initial value IEV is 7. Also in FIG. 8, it is assumed that an image is captured in a condition close to the indoor condition. The meanings of legends and reference numbers in FIG. 8 are substantially the same as those of FIGS. 3 and 7. Detailed descriptions of operations that are substantially the same as those in FIGS. 3 and 7 are omitted here.

In FIG. 8, in the periods T1 through T3 before a detection result becomes within the valid range, the signal processor SP reads image data corresponding to lines in a middle portion (⅛ of all lines) of an image captured by the sensor ISEN for each frame F. In this case, assuming that the frame rate in and after the period T4 is 30 fps, the frame rate in the periods T1 through T3 becomes 240 fps (=30×8 fps).

In the period T1, the number of lines of image data to be read is set at one eighth (⅛) of all lines, and the EV value is initialized to 7. Then, the first frame F1 is exposed, and image data (corresponding to ⅛ of all lines) of the frame F1 is output from the sensor ISEN. Because the initial value of the EV value is close to an appropriate EV value, the output of the sensor ISEN is about 92. That is, the output of the sensor ISEN in the period T1 is between the upper limit of 1000 and the lower limit of 45.

In the period T2, the EV value is set at 11 (=7+4), and the second frame F2 is exposed. The output of the sensor ISEN in the period T2 is less than the lower limit of 45. Also in the period T2, the image data (corresponding to ⅛ of all lines) of the frame F1 is transferred to the image processor ISP.

In the period T3, the EV value is set at 15 (=11+4), and the third frame F3 is exposed. The output of the sensor ISEN in the period T3 is less than the lower limit of 45. Also in the period T3, the image data (corresponding to ⅛ of all lines) of the frame F2 is transferred to the image processor ISP. Further in the period T3, image brightness of the frame F1 is calculated. The image brightness of the frame F1 is about 92 that is between the upper limit of 1000 and the lower limit of 45.

Accordingly, the EV value to be set in the next period T4 is calculated based on the EV value (=7) used to expose the frame F1, the image brightness (about 92) of the frame F1, and the target brightness (about 184). That is, an EV value (appropriate EV value) corresponding to the target brightness is calculated.

In the period T4, the number of lines of image data to be read is set at "All", and the EV value is set at 6 (=7+log$_2$ (92/184)). Then, the fourth frame F4 is exposed. As a result, image data (all lines) of the frame F4 is output from the sensor ISEN.

Thus, in the period T4, an appropriate EV value calculated based on the detection result of the frame F1 is set in the sensor ISEN, and the entire image data (all lines) is output from the sensor ISEN.

That is, in and after the period T4, the digital camera CAM operates at a frame rate of 30 fps. Operations of the digital camera CAM in and after the period T4 of FIG. 8 are substantially the same as those in and after the period T6 of FIG. 3. For example, in the period T6, an image of the frame F4 is displayed on the display.

Thus, according to the embodiment of FIG. 8, the digital camera CAM can operate at a frame rate (240 fps) higher than the frame rate in a normal operation (in and after the period T4) until an appropriate EV value is set (in the periods T1 through T3). Thus, compared with the embodiment of FIG. 7, the embodiment of FIG. 8, where the initial value IEV is close to an appropriate EV value, makes it possible to reduce the time taken by the digital camera CAM to set an appropriate exposure after start-up, and thereby makes it possible to reduce the time taken by the digital camera CAM to display an image on the display after start-up.

For example, according to the embodiment of FIG. 8, the time necessary to set an appropriate EV value after the digital camera CAM is turned on is about 12.6 ms (=4.2 ms×3). Also according to the embodiment of FIG. 8, the digital camera CAM can display images on the display in and after the period T6. In this case, the time necessary to display an image on the display after the digital camera CAM is turned on is about 79.2 ms (=4.2 ms×3+33.3 ms×2).

Figure 9:
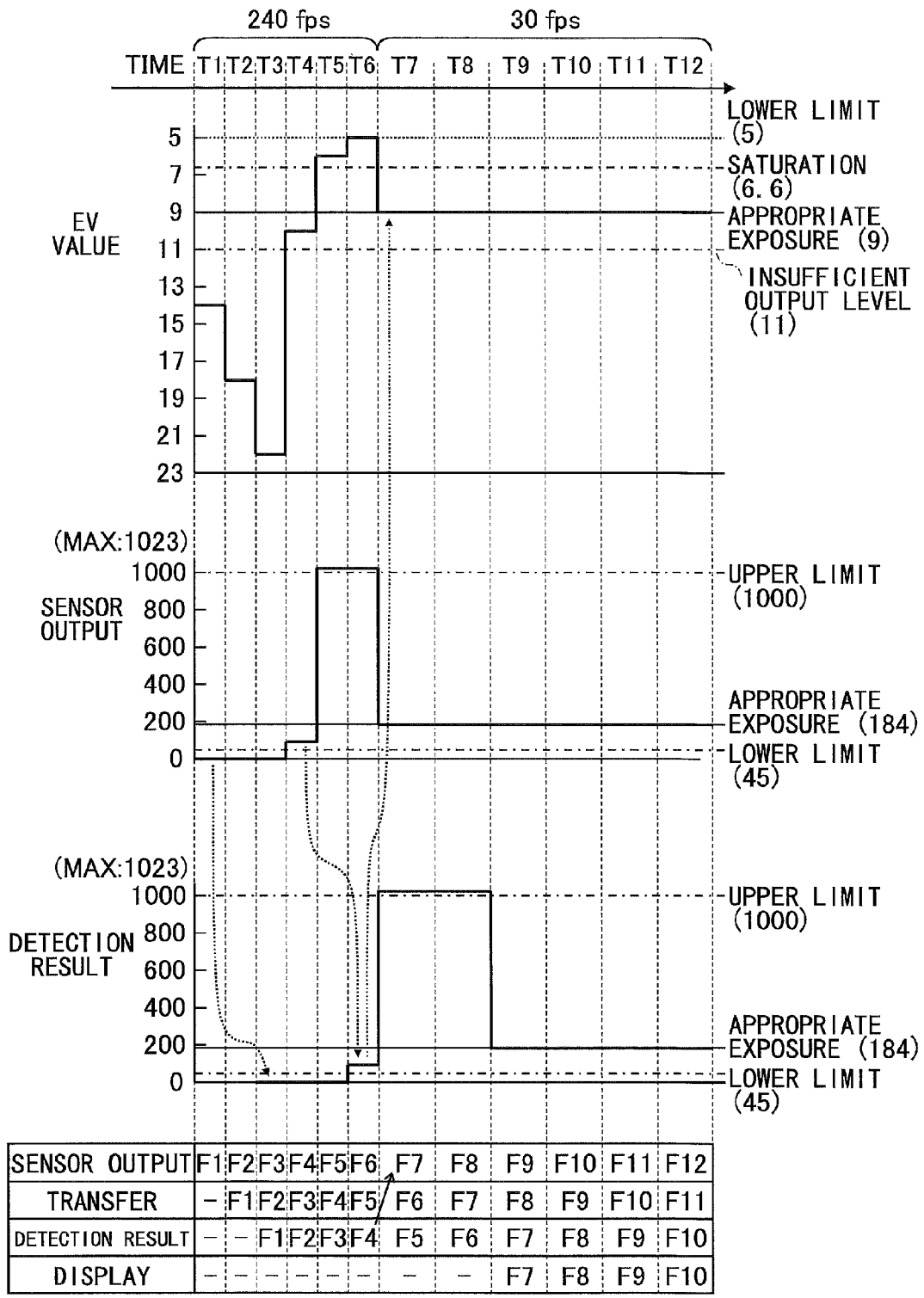
FIG. 9 is a graph illustrating other exemplary exposure values that are set according to the process of FIG. 5.

FIG. 9 is a graph illustrating other exemplary exposure values that are set according to the process of FIG. 5. In FIG. 9, it is assumed that the initial value of the EV value (initial value IEV) is greater than an exposure value with which the output of the sensor ISEN becomes insufficient. In the example of FIG. 9, the initial value IEV is 14. Also in FIG. 9, it is assumed that an image is captured in a condition where brightness is between the brightness in the indoor condition and the brightness in the cloudy condition. The meanings of legends and reference numbers in FIG. 9 are substantially the same as those of FIGS. 3, 7, and 8. Detailed descriptions of operations that are substantially the same as those in FIGS. 3, 7, and 8 are omitted here.

In FIG. 9, in the periods T1 through T6 before a detection result becomes within the valid range, the signal processor SP reads image data corresponding to lines in a middle portion (⅛ of all lines) of an image captured by the sensor ISEN for each frame F. In this case, assuming that the frame rate in and after the period T7 is 30 fps, the frame rate in the periods T1 through T6 becomes 240 fps (=30×8 fps).

In the period T1, the number of lines of image data to be read is set at one eighth (⅛) of all lines, and the EV value is initialized to 14. Then, the first frame F1 is exposed, and image data (corresponding to ⅛ of all lines) of the frame F1 is output from the sensor ISEN. In FIG. 9, because the initial value IEV is greater than an exposure value with which the output of the sensor ISEN becomes insufficient, the output of the sensor ISEN in the period T2 is less than the lower limit of 45.

In the period T2, the EV value is set at 18 (=14+4), and the second frame F2 is exposed. The output of the sensor ISEN in the period T2 is less than the lower limit of 45. Also in the period T2, the image data (corresponding to ⅛ of all lines) of the frame F1 is transferred to the image processor ISP.

In the period T3, the EV value is set at 22 (=18+4), and the third frame F3 is exposed. The output of the sensor ISEN in the period T3 is less than the lower limit of 45. Also in the period T3, the image data (corresponding to ⅛ of all lines) of the frame F2 is transferred to the image processor ISP. Further in the period T3, image brightness of the frame F1 is calculated. The image brightness of the frame F1 is less than the lower limit of 45.

Because the image brightness less than the lower limit of 45 is calculated for the first frame F1, in the next period T4, the EV value is set at a value obtained by subtracting 4 (the adjustment amount) from the initial value IEV (=14). Thus, in the embodiment of FIG. 9, when the EV value is updated in a direction away from the valid range, the direction of updating the EV value is changed to a direction toward the valid range.

In the period T4, the EV value is set at 10 (=14−4), and the fourth frame F4 is exposed. As a result, image data (corresponding to ⅛ of all lines) of the frame F4 is output from the sensor ISEN. The output of the sensor ISEN in the period T4 is about 92. That is, the output of the sensor ISEN in the period T4 is between the upper limit of 1000 and the lower limit of 45.

Also in the period T4, the image data (corresponding to ⅛ of all lines) of the frame F3 is transferred to the image processor ISP. Further in the period T4, image brightness of the frame F2 is calculated. The image brightness of the frame F2 is less than the lower limit of 45. Because the frame F2, for which image brightness less than the lower limit of 45 is calculated, is not the first frame (i.e., is different from the frame F1), in the next period T5, the EV value is set at a value obtained by subtracting 4 (the adjustment amount) from the current EV value (=10).

In the period T5, the EV value is set at 6 (=10−4), and the fifth frame F5 is exposed. As a result, image data (corresponding to ⅛ of all lines) of the frame F5 is output from the sensor ISEN. The output of the sensor ISEN in the period T5 is saturated (i.e., greater than the upper limit of 1000). Also in the period T5, the image data (corresponding to ⅛ of all lines) of the frame F4 is transferred to the image processor ISP. Further in the period T5, image brightness of the frame F3 is calculated. The image brightness of the frame F3 is less than the lower limit of 45.

In the period T6, the EV value is set at 5 (the minimum EV value), and the sixth frame F6 is exposed. As a result, image data (corresponding to ⅛ of all lines) of the frame F6 is output from the sensor ISEN. The output of the sensor ISEN in the period T6 is saturated (i.e., greater than the upper limit of 1000). Also in the period T6, the image data (corresponding to ⅛ of all lines) of the frame F5 is transferred to the image processor ISP.

Further in the period T6, image brightness of the frame F4 is calculated. The image brightness of the frame F4 is about 92 that is between the upper limit of 1000 and the lower limit of 45. Accordingly, the EV value to be set in the next period T7 is calculated based on the EV value (=10) used to expose the frame F4, the image brightness (about 92) of the frame F4, and the target brightness (about 184). That is, an EV value (appropriate EV value) corresponding to the target brightness is calculated.

Also, because the EV value corresponding to the target brightness is calculated, the number of lines of image data to be read in the next period T7 is set at "All".

In the period T7, the number of lines of image data to be read is set at "All", and the EV value is set at 9 (=10+log$_2$(92/184)). Then, the seventh frame F7 is exposed. As a result, image data (all lines) of the frame F7 is output from the sensor ISEN.

Thus, in the period T7, an appropriate EV value calculated based on the detection result of the frame F4 is set in the sensor ISEN, and the entire image data (all lines) is output from the sensor ISEN. That is, in and after the period T7, the digital camera CAM operates at a frame rate of 30 fps. Operations of the digital camera CAM in and after the period T7 of FIG. 9 are substantially the same as those in and after the period T6 of FIG. 7. For example, in the period T9, an image of the frame F7 is displayed on the display.

Thus, according to the embodiment of FIG. 9, the digital camera CAM can operate at a frame rate (240 fps) higher than the frame rate in a normal operation (in and after the period T7) until an appropriate EV value is set (in the periods T1 through T6).

Thus, compared with the embodiment of FIG. 3, the embodiment of FIG. 9 makes it possible to reduce the time taken by the digital camera CAM to set an appropriate exposure after start-up, and thereby makes it possible to reduce the time taken by the digital camera CAM to display an image on the display after start-up.

For example, according to the embodiment of FIG. 9, the time necessary to set an appropriate EV value after the digital camera CAM is turned on is about 25.2 ms (=4.2 ms×6). Also according to the embodiment of FIG. 9, the digital camera CAM can display images on the display in and after the period T9. In this case, the time necessary to display an image on the display after the digital camera CAM is turned on is about 91.8 ms (=4.2 ms×6+33.3 ms×2).

Figure 10:
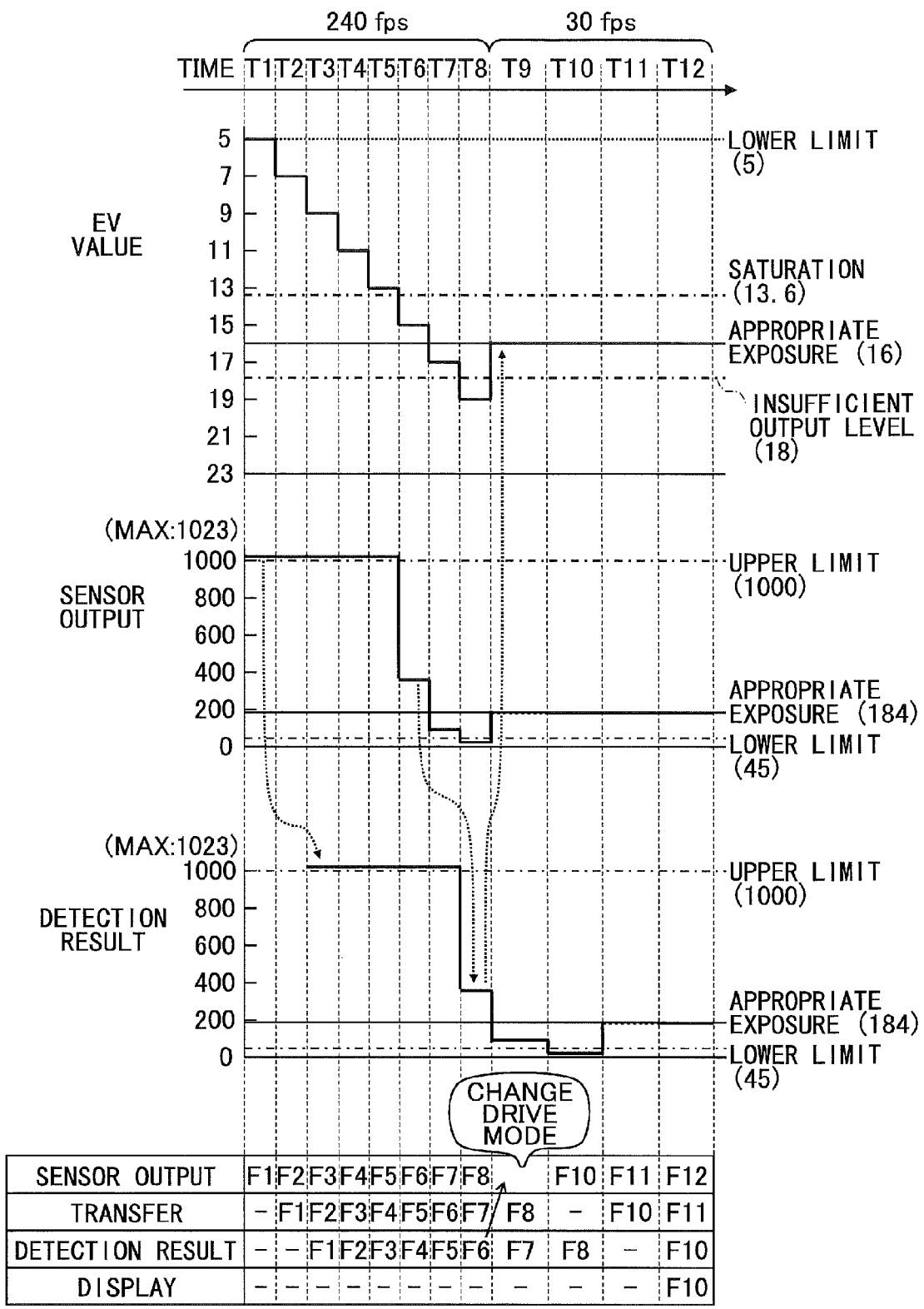
FIG. 10 is a graph illustrating exposure values that are set according to a comparative example.

FIG. 10 is a graph illustrating exposure values set according to a comparative example. In FIG. 10, it is assumed that the initial value of the EV value (initial value IEV) is less than an exposure value with which the output of the sensor ISEN is saturated. The condition for capturing an image in FIG. 10 is substantially the same as that of FIG. 7. Also, the meanings of legends and reference numbers in FIG. 10 are substantially the same as those of FIGS. 3, 7, 8, and 9. Detailed descriptions of operations that are substantially the same as those in FIGS. 3, 7, 8, and 9 are omitted here. In the comparative example of FIG. 10, at the start-up, the digital camera CAM sets the sensor ISEN in a high-speed mode where pixels are skipped, and performs AE calculations while the frame rate is high. For example, the frame rate in the periods T1 through T8 before a detection result becomes within the valid range is 240 fps (=30×8 fps), and the frame rate in and after the period T9 is 30 fps. The drive mode of the sensor ISEN is changed in the period T9.

Also in the comparative example of FIG. 10, the EV value is updated only in one direction, i.e., is increased until the detection result becomes within the valid range. For this reason, the initial value IEV is set at 5 (the minimum EV value). Also in the comparative example of FIG. 10, the adjustment amount for changing the EV value is 2.

In the period T1, the sensor ISEN is set in a high-speed mode where pixels are skipped. Accordingly, the digital camera CAM operates at a frame rate of, for example, 240 fps. Also in the period T1, the EV value is initialized to 5, and the first frame F1 is exposed. In the periods T2, T3, T4, T5, and T6, the EV value is set at 7, 9, 11, 13, and 15, respectively. The output of the sensor ISEN in each of the periods T1 through T5 is saturated (i.e., greater than the upper limit of 1000). On the other hand, the output of the sensor ISEN in the period T6 is about 368.

In the period T7, the EV value is set at 17 (=15+2), and the seventh frame F7 is exposed. The output of the sensor ISEN in the period T7 is about 92. Also in the period T7, the image data of the frame F6 is transferred to the image processor ISP. Further in the period T7, image brightness of the frame F5 is calculated. The image brightness of the frame F5 is saturated (i.e., greater than the upper limit of 1000).

In the period T8, the EV value is set at 19 (=17+2), and the eighth frame F8 is exposed. The output of the sensor ISEN in the period T8 is less than the lower limit of 45. Also in the period T8, the image data of the frame F7 is transferred to the image processor ISP. Further in the period T8, image brightness of the frame F6 is calculated. The image brightness of the frame F6 is about 368 that is between the upper limit of 1000 and the lower limit of 45.

Accordingly, the EV value to be set in the next period T9 is calculated based on the EV value (=15) used to expose the frame F6, the image brightness (about 368) of the frame F6, and the target brightness (about 184). That is, an EV value (appropriate EV value) corresponding to the target brightness is calculated. Also, because the EV value corresponding to the target brightness is calculated, the drive mode of the sensor ISEN is changed to the full pixel mode in the next period T9.

Accordingly, the digital camera CAM operates at a frame rate of 240 fps in the periods T1 through T8, and operates at a frame rate of 30 fps in and after the period T9.

In the period T9, the drive mode of the sensor ISEN is changed to the full pixel mode, and the EV value is set at 16 (=15+log$_2$(368/184)). Here, in the period T9, no image is captured because the drive mode is changed (from the high-speed mode to the full pixel mode). That is, no image corresponding to the frame F9 is generated. In FIG. 10, for descriptive purposes, the numerals assigned to periods T correspond to the numerals assigned to frames F. Therefore, a frame F captured after the frame F8 (i.e., a frame exposed in the period T10) is referred to as a "frame F10".

In the period T10, the frame F10 is exposed. That is, the sensor ISEN with the EV value set at 16 (appropriate exposure) captures the frame F10 in the full pixel mode. As a result, image data (full pixel image data) of an image with brightness substantially the same as the target brightness (about 184) is output from the sensor ISEN. The Image data of the frame F10 exposed with the appropriate EV value is transferred to the image processor ISP in the period T11. As a result, in the period T12, the image of the frame F10 is displayed on the display.

Thus, according to the comparative example, the digital camera CAM can capture images with an appropriate EV value in and after the period T10. In this case, the digital camera CAM can display images on the display in and after the period T12. For example, according to the comparative example of FIG. 10, the time necessary for the digital camera CAM to capture an image with an appropriate EV value after start-up is about 66.9 ms (=4.2 ms×8+33.3 ms). Also according to the comparative example of FIG. 10, the time necessary to display an image on the display after the digital camera CAM is turned on is about 133.5 ms (=4.2 ms×8+33.3 ms×3).

When the adjustment amount of 4, which is used in FIG. 7, is also used in the comparative example of FIG. 10 to calculate an EV value for the next period T while the detection result is saturated, the EV values set in the periods T1, T2, T3, and T4 become 5, 9, 13, and 17, respectively. In this case, the time necessary for the digital camera CAM to capture an image with an appropriate EV value after start-up is about 58.5 ms (=4.2 ms×6+33.3 ms).

On the other hand, according to the embodiment of FIG. 7, the time necessary for the digital camera CAM to capture an image with an appropriate EV value after start-up is about 21 ms (=4.2 ms×5). Thus, compared with the comparative example of FIG. 10, the embodiment of FIG. 7 makes it possible to reduce the time necessary for the digital camera CAM to capture an image with an appropriate EV value after start-up, and thereby makes it possible to reduce the time necessary for the digital camera CAM to display an image on the display after start-up.

The digital camera CAM and the exposure control methods of the embodiments described above with reference to FIGS. 5 through 9 also provide advantageous effects similar to those provided by the digital camera CAM and the exposure control method described with reference to FIGS. 1 through 3. According to the embodiments, the setter SET changes the exposure value for each frame F by the predetermined adjustment amount until the brightness of an image captured by the sensor ISEN becomes within the valid range. When image brightness becomes within the valid range, the calculator CAL calculates an exposure value corresponding to the target brightness level based on the image brightness.

The adjustment amount may be determined in advance based on, for example, a difference between an exposure value corresponding to the lower limit of the valid range and an exposure value corresponding to the upper limit of the valid range. Setting the adjustment amount in this manner makes it possible to efficiently find an EV value corresponding to image brightness within the valid range. Thus, the above embodiments make it possible to reduce the time taken by the digital camera CAM to set an appropriate exposure after start-up, and thereby makes it possible to reduce the time taken by the digital camera CAM to display an image on the display after start-up.

Also in the embodiments of FIGS. 5 through 9, while image brightness is not within the valid range, the signal processor SP reads only a part of image data corresponding to lines in a middle portion of an image to calculate the image brightness. After an exposure value corresponding to the target brightness is calculated, the signal processor SP reads image data corresponding to the entire image. With this configuration, the digital camera CAM can reduce time for reading image data and increase the frame rate in a time period before the image brightness becomes within the valid range.

Here, the sensor ISEN captures images without changing its drive mode (or using the same drive mode) in a time period before the image brightness becomes within the valid range and in a time period after an exposure value corresponding to the target brightness is calculated. For example, the digital camera CAM drives the sensor ISEN in the full pixel mode where an image is captured without skipping pixels even in a time period before the image brightness becomes within the valid range.

Accordingly, the above embodiments make it possible to change frame rates without changing the drive mode of the sensor ISEN (e.g., without changing the drive mode from the high-speed mode to the normal full pixel mode), and thereby make it possible to prevent a processing delay caused by changing the drive mode. Thus, compared with the embodiment of FIGS. 1 through 3, the embodiments of FIGS. 5 through 9 make it possible to reduce the time taken by the digital camera CAM to set an appropriate exposure after start-up, and thereby makes it possible to reduce the time taken by the digital camera CAM to display an image on the display after start-up.

Figure 11:
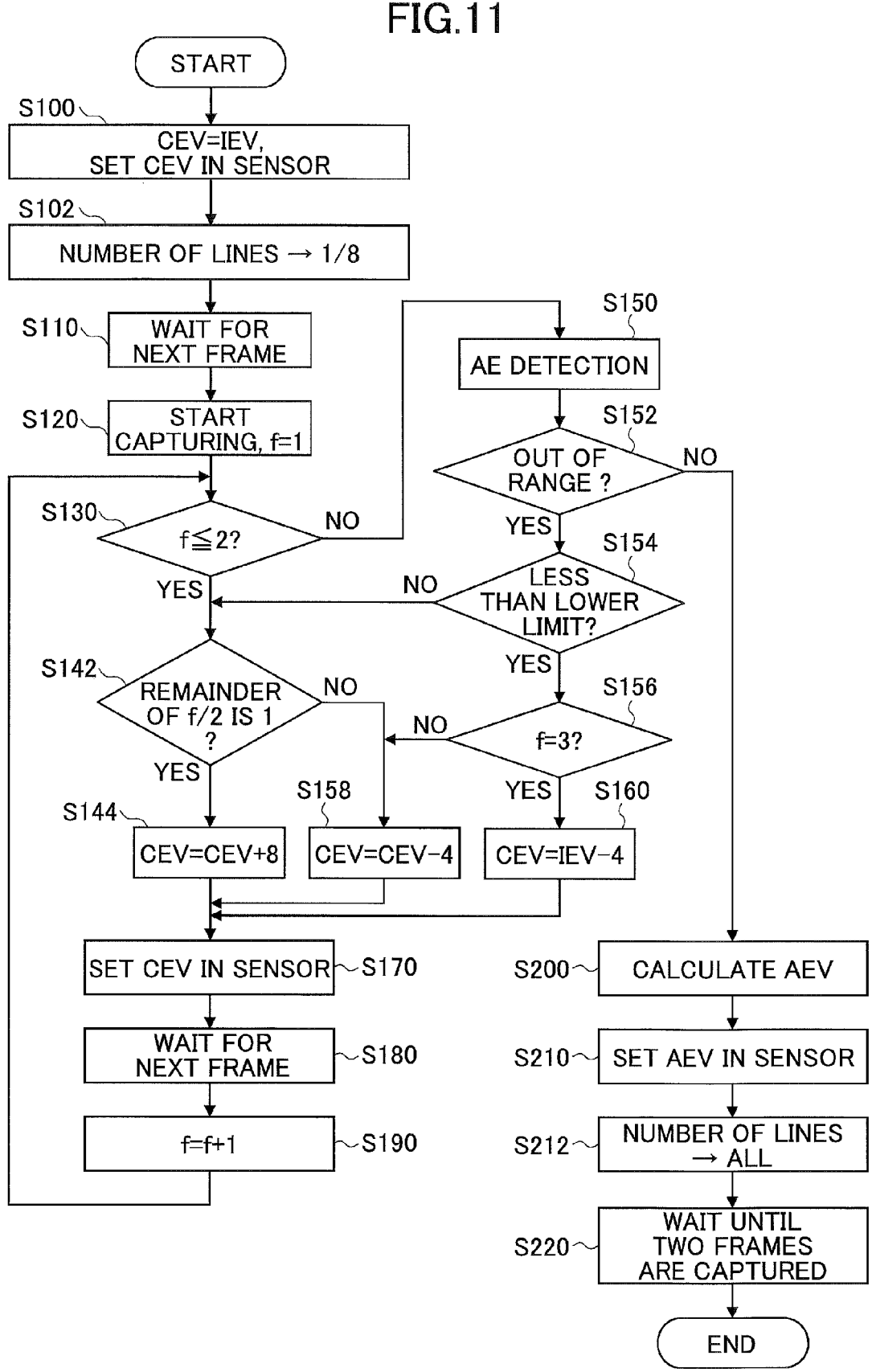
FIG. 11 is a flowchart illustrating another exemplary process performed by a digital camera.

FIG. 11 is a flowchart illustrating another exemplary process performed by the digital camera CAM of FIG. 1. In other words, FIG. 11 illustrates an exposure control method of the digital camera CAM according to an embodiment. In FIG. 11, step S142 is added to the process of FIG. 5, and step S140 of FIG. 5 is replaced with step S144. Other steps in FIG. 11 are substantially the same as the corresponding steps in FIG. 5. Detailed descriptions of steps that are substantially the same as those in FIG. 5 are omitted here. The process of FIG. 11 may be started when the digital camera CAM is turned on and/or when the operation mode of the digital camera CAM is changed to a shooting mode (a mode for capturing an image). The process of FIG. 11 may be performed solely by hardware or by controlling hardware with software.

Step S142 is performed when the flag f is less than or equal to 2 (YES at step S130). At step S142, the digital camera CAM determines whether the remainder of dividing the flag f by 2 is 1. When the remainder of dividing the flag f by 2 is 1 (YES at step S142), the process of the digital camera CAM proceeds to step S144.

On the other hand, when the remainder of dividing the flag f by 2 is not 1 (NO at step S142), the process of the digital camera CAM proceeds to step S158. Step S158 is also performed when it is determined at step S156 that the flag f is not 3 (NO at step S156).

At step S144, the setter SET increases the exposure value CEV by a value that is two times greater than the adjustment amount (=4). For example, the setter SET adds 8 (adjustment amount×2) to the current exposure value CEV. The increased exposure value CEV obtained by adding 8 (adjustment amount×2) to the current exposure value CEV is used to capture the next frame. Step S144 may instead be performed by the calculator CAL.

At step S158, the setter SET decreases the exposure value CEV by the adjustment amount (=4).

For example, the setter SET subtracts 4 (adjustment amount) from the current exposure value CEV. The decreased exposure value CEV obtained by subtracting 4 (adjustment amount) from the current exposure value CEV is used to capture the next frame. Step S158 may instead be performed by the calculator CAL.

With the above configuration, while the image brightness is saturated, the exposure value is changed for each frame F in a zigzag pattern, i.e., in such a manner that the exposure value is not changed in the same direction (in an increasing direction to increase the exposure value or in a decreasing direction to decrease the exposure value) three or more times in succession The process of FIG. 11 makes it possible to improve the efficiency in searching for an EV value corresponding to image brightness within the valid range when, for example, images are most frequently captured in the indoor condition, and the frequency of capturing images in the clear-sky condition is greater than the frequency of capturing images in the cloudy condition. For example, the digital camera CAM can search for an EV value corresponding to image brightness within the valid range by setting the EV value at 7 suitable for the indoor condition, at 15 suitable for the clear-sky condition, and at 11 suitable for the cloudy condition in this order.

The process performed by the digital camera CAM is not limited to the example described above. For example, the digital camera CAM may be configured to determine whether the flag f is 1, 2, 3, or 4 or greater instead of performing step S142. In this case, for example, the digital camera CAM may be configured to perform step S144 when the flag f is 1 or 3, to perform step S158 when the flag f is 2, and to increase the exposure value CEV by the adjustment amount (=4) when the flag f is 4 or greater. Also, the digital camera CAM may be configured to perform step S158 when the flag f is 1, to perform step S144 when the flag f is 2, and to increase the exposure value CEV by the adjustment amount (=4) when the flag f is 3 or greater.

Figure 12:
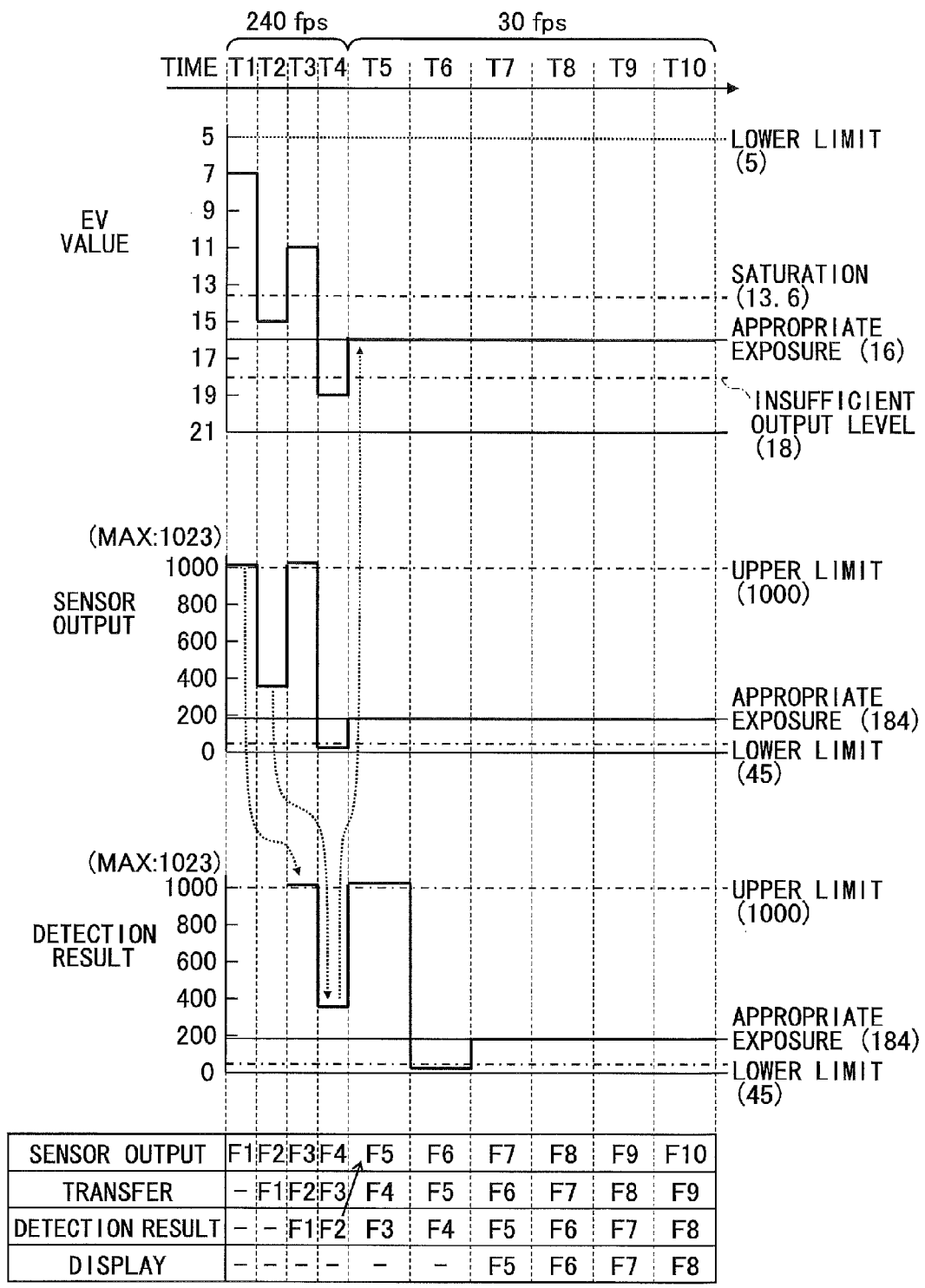
FIG. 12 is a graph illustrating exemplary exposure values that are set according to the process of FIG. 11.

FIG. 12 is a graph illustrating exemplary exposure values that are set according to the process of FIG. 11. In FIG. 12, it is assumed that the initial value of the EV value (initial value IEV) is less than an exposure value with which the output of the sensor ISEN is saturated. In the example of FIG. 12, the initial value IEV is 7. The condition for capturing an image in FIG. 12 is substantially the same as that of FIG. 7. Also, the meanings of legends and reference numbers in FIG. 12 are substantially the same as those of FIGS. 3, 7, 8, and 9. Detailed descriptions of operations that are substantially the same as those in FIGS. 3, 7, 8, and 9 are omitted here.

In FIG. 12, in the periods T1 through T4 before a detection result becomes within the valid range, the signal processor SP reads image data corresponding to lines in a middle portion (⅛ of all lines) of an image captured by the sensor ISEN for each frame F. In this case, assuming that the frame rate in and after the period T5 is 30 fps, the frame rate in the periods T1 through T4 becomes 240 fps (=30×8 fps).

In the period T1, the number of lines of image data to be read is set at one eighth (⅛) of all lines, and the EV value is initialized to 7. Then, the first frame F1 is exposed, and image data (corresponding to ⅛ of all lines) of the frame F1 is output from the sensor ISEN. The output of the sensor ISEN in the period T1 is saturated (i.e., greater than the upper limit of 1000).

In the period T2, the EV value is set at 15 (=7+8), and the second frame F2 is exposed. The output of the sensor ISEN in the period T2 is about 368 that is between the upper limit of 1000 and the lower limit of 45. Also in the period T2, the image data (corresponding to ⅛ of all lines) of the frame F1 is transferred to the image processor ISP.

In the period T3, the EV value is set at 11 (=15−4), and the third frame F3 is exposed. The output of the sensor ISEN in the period T3 is saturated (i.e., greater than the upper limit of 1000). Also in the period T3, the image data (corresponding to ⅛ of all lines) of the frame F2 is transferred to the image processor ISP.

Further in the period T3, image brightness of the frame F1 is calculated. The image brightness of the frame F1 is saturated (i.e., greater than the upper limit of 1000).

In the period T4, the EV value is set at 19 (=11+8), and the fourth frame F4 is exposed. The output of the sensor ISEN in the period T4 is less than the lower limit of 45. Also in the period T4, the image data (corresponding to ⅛ of all lines) of the frame F3 is transferred to the image processor ISP. Further in the period T4, image brightness of the frame F2 is calculated. The image brightness of the frame F2 is about 368 that is between the upper limit of 1000 and the lower limit of 45.

Accordingly, the EV value to be set in the next period T5 is calculated based on the EV value (=15) used to expose the frame F2, the image brightness (about 368) of the frame F2, and the target brightness (about 184). That is, an EV value (appropriate EV value) corresponding to the target brightness is calculated.

In the period T5, the number of lines of image data to be read is set at "All", and the EV value is set at 16 (=15+log$_2$ (368/184)). Then, the fifth frame F5 is exposed. As a result, image data (all lines) of the frame F5 is output from the sensor ISEN.

Thus, in the period T5, an appropriate EV value calculated based on the detection result of the frame F2 is set in the sensor ISEN, and the entire image data (all lines) is output from the sensor ISEN. That is, in and after the period T5, the digital camera CAM operates at a frame rate of 30 fps. Operations of the digital camera CAM in and after the period T5 of FIG. 12 are substantially the same as those in and after the period T6 of FIG. 7. For example, in the period T7, an image of the frame F5 is displayed on the display.

Thus, according to the embodiment of FIG. 12, the digital camera CAM can operate at a frame rate (240 fps) higher than the frame rate in a normal operation (in and after the period T5) until an appropriate EV value is set (in the periods T1 through T4). The embodiment of FIG. 12 also makes it possible to efficiently search for an EV value corresponding to image brightness within the valid range when, for example, images are more frequently captured in the clear-sky condition than in the cloudy condition.

Accordingly, when images are captured in the clear-sky condition, the embodiment of FIG. 12, compared with the embodiment of FIG. 7, makes it possible to reduce the time taken by the digital camera CAM to set an appropriate exposure after start-up and to reduce the time taken by the digital camera CAM to display an image on the display after start-up.

For example, according to the embodiment of FIG. 12, the time necessary to set an appropriate EV value after the digital camera CAM is turned on is about 16.8 ms (=4.2 ms×4). Also according to the embodiment of FIG. 12, the digital camera CAM can display images on the display in and after the period T7. In this case, the time necessary to display an image on the display after the digital camera CAM is turned on is about 83.4 ms (=4.2 ms×4+33.3 ms×2).

As described above, the digital camera CAM and the exposure control method according to the embodiment of FIGS. 11 and 12 also provide advantageous effects similar to those provided by the digital camera CAM and the exposure control method according to the embodiments of FIGS. 5 through 9. According to the embodiment of FIGS. 11 and 12, the setter SET changes the exposure value for each frame F by the predetermined adjustment amount until the brightness of an image captured by the sensor ISEN becomes within the valid range. When the image brightness becomes within the valid range, the calculator CAL calculates an exposure value corresponding to the target brightness level based on the image brightness.

Also according to the embodiment of FIGS. 11 and 12, while image brightness is not within the valid range, the signal processor SP reads only a part of image data corresponding to lines in a middle portion of an image to calculate the image brightness. After an exposure value corresponding to the target brightness is calculated, the signal processor SP reads image data corresponding to the entire image. This configuration makes it possible to reduce the time taken by the digital camera CAM to set an appropriate exposure after start-up, and thereby makes it possible to reduce the time taken by the digital camera CAM to display an image on the display after start-up.

Also according to the embodiment of FIGS. 11 and 12, the setter SET sets, for the second frame F2, an EV value obtained by adding a value two times greater than the adjustment amount to the EV value of the first frame F1, and sets, for the third frame F3, an EV value that is obtained by subtracting the adjustment amount from the EV value of the second frame F2. When, for example, the frequency of capturing images in a first condition corresponding to an EV value obtained by adding a value two times greater than the adjustment amount to the initial value is greater than the frequency of capturing images in a second condition corresponding to an EV value obtained by adding the adjustment amount to the initial value, the above configuration makes it possible to efficiently search for an EV value corresponding to image brightness within the valid range. Thus, the above embodiment makes it possible to reduce the time taken by the digital camera CAM to set an appropriate exposure after start-up, and thereby makes it possible to reduce the time taken by the digital camera CAM to display an image on the display after start-up.

Figure 13:
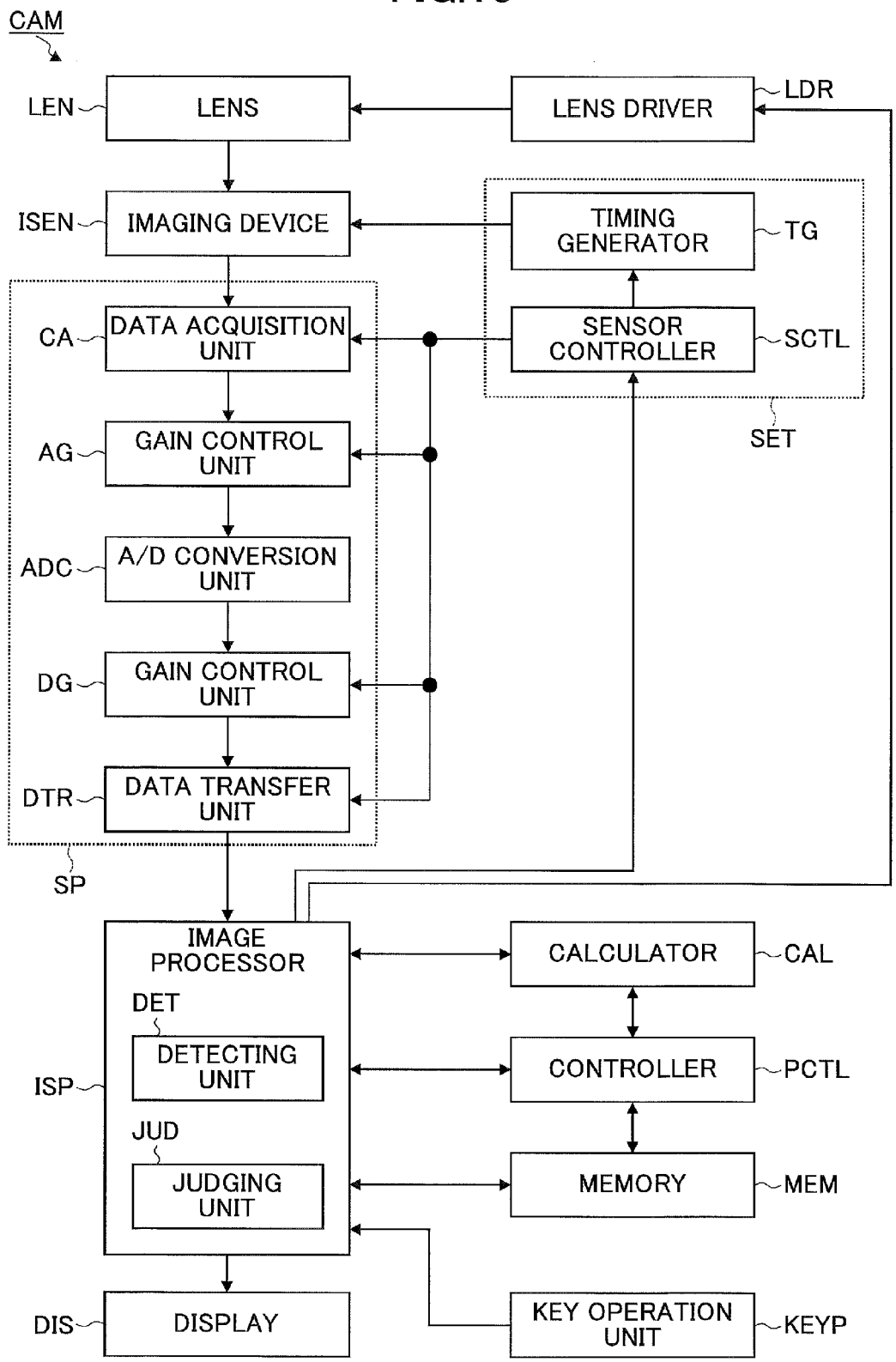
FIG. 13 is a block diagram illustrating an exemplary hardware configuration of a digital camera.

FIG. 13 is a block diagram illustrating an exemplary hardware configuration of the digital camera CAM. The same symbols as those assigned to components of FIG. 1 are assigned to the corresponding components in FIG. 13, and detailed descriptions of those components are omitted here.

The digital camera CAM may include the lens LEN, the imaging device ISEN, the signal processor SP, the image processor ISP, the calculator CAL, and the setter SET. The digital camera CAM also includes a display DIS, a controller PCTL, a memory MEM, a key operation unit KEYP, and a lens driver LDR.

The lens LEN includes one or more lenses such as a focus lens and a zoom lens, and focuses incident light on a light-receiving surface of the imaging device ISEN. The lens driver LDR controls (or drives) the lens LEN. The imaging device ISEN generates electrical charge corresponding to the amount of light received via the lens LEN.

The signal processor SP may include a data acquisition unit (or reader) CA, gain control units AG and DG, an A/D conversion unit ADC, and a data transfer unit DTR. The data acquisition unit CA reads image data from the imaging device ISEN in units of lines. The data acquisition unit CA also sets the number of lines of image data to be read. For example, while image brightness is not within the valid range, the data acquisition unit CA reads only a part of image data corresponding to lines in a middle portion of an image.

The gain control unit AG performs gain control on analog image data (which is represented by an analog signal) read by the data acquisition unit CA. The A/D conversion unit ADC the gain-controlled analog image data into digital image data (which is represented by a digital signal). The gain control unit DG performs gain control on the digital image data converted by the A/D conversion unit ADC. The data transfer unit DTR transfers the gain-controlled digital image data to the image processor ISP.

The setter SET may include a sensor controller SCTL and a timing generator TG. The sensor controller SCTL controls the data acquisition unit CA, the gain control units AG and DG, the A/D conversion unit ADC, the data transfer unit DTR, and the timing generator TG. The timing generator TG sets, for example, an exposure time.

The image processor ISP includes the detecting unit DET and the judging unit JUD, and performs, for example, transmission and reception, conversion, and detection of image data as described above with reference to FIG. 1. The image processor ISP also receives instructions and commands from the key operation unit KEYP.

The controller PCTL controls the image processor ISP, the memory MEM, and the calculator CAL. The calculator CAL performs calculations requested by the controller PCTL. For example, the calculator CAL performs exposure calculations such as calculations of exposure values. The memory MEM stores, for example, programs and data used by the controller PCTL, and image data and detection data (detection results) processed by the image processor ISP. The key operation unit KEYP receives key operations performed by a user, and reports information on the received key operations to the image processor ISP. The display DIS displays an image.

The hardware configuration of the digital camera CAM is not limited to the example described above. For example, the judging unit JUD may be provided in the controller PCTL.

An aspect of this disclosure provides a digital camera and an exposure control method and makes it possible to reduce the time taken by the digital camera CAM to set an appropriate exposure after start-up.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a digital camera, the method comprising:
    calculating brightness of image data captured by an imaging device;
    determining whether the brightness of the image data is within a valid range for controlling a set exposure value of the imaging device;
    changing the set exposure value for each frame until the brightness of the image data becomes within the valid range, based on a difference between a first exposure value corresponding to a lower limit of the valid range and a second exposure value corresponding to an upper limit of the valid range;
    after the brightness of the image data becomes within the valid range, controlling the set exposure value based on the brightness of the image data within the valid range and a valid exposure value corresponding to the brightness of the image data within the valid range;
    reading, from the imaging device, a part of the image data corresponding to lines in a middle portion of the image data during a first period before the brightness of the image data becomes within the valid range; and
    reading, from the imaging device, entire data of the image data during a second period after the set exposure value is controlled based on the brightness of the image data within the valid range and the valid exposure value,
    wherein the image data is captured by the imaging device in a full pixel mode where an image is captured without skipping pixels in the first period and the second period, and
    wherein a number of lines of the part of the image data is 1/k of a number of lines of the entire data of the image data, and the part of the image data is read in the first period at a frame rate that is k times greater than a frame rate in the second period, wherein k is greater than 1.

2. The method as claimed in claim 1, further comprising:
    setting an initial value of the set exposure value to be changed for each frame at a value that is greater than or equal to a minimum exposure value of the imaging device and less than or equal to 7.

3. The method as claimed in claim 2, wherein the changing the set exposure value for each frame includes
    setting the set exposure value for a first frame at the initial value;
    setting the set exposure value for a second frame at a value obtained by adding a value two times greater than an adjustment amount to the set exposure value for the first frame, the adjustment amount being obtained based on the difference between the first exposure value and the second exposure value; and
    setting the set exposure value for a third frame at a value obtained by subtracting the adjustment amount from the set exposure value for the second frame.

4. A digital camera, comprising:
    an imaging device that captures image data;
    a detector that calculates brightness of the image data captured by the imaging device;
    a determiner that determines whether the brightness of the image data is within a valid range for controlling a set exposure value of the imaging device;
    a setter that changes the set exposure value for each frame until the brightness of the image data becomes within the valid range, based on a difference between a first exposure value corresponding to a lower limit of the valid range and a second exposure value corresponding to an upper limit of the valid range;
    a calculator that, after the brightness of the image data becomes within the valid range, controls the set exposure value based on the brightness of the image data within the valid range and a valid exposure value corresponding to the brightness of the image data within the valid range; and
    a reader that
        reads, from the imaging device, a part of the image data corresponding to lines in a middle portion of the image data during a first period before the brightness of the image data becomes within the valid range; and
        reads, from the imaging device, entire data of the image data during a second period after the set exposure value is controlled based on the brightness of the image data within the valid range and the valid exposure value,
    wherein the image data is captured by the imaging device in a full pixel mode where an image is captured without skipping pixels in the first period and the second period, and
    wherein a number of lines of the part of the image data is 1/k of a number of lines of the entire data of the image data, and the part of the image data is read in the first period at a frame rate that is k times greater than a frame rate in the second period, wherein k is greater than 1.

5. The digital camera as claimed in claim 4, wherein the setter sets an initial value of the set exposure value to be changed for each frame at a value that is greater than or equal to a minimum exposure value of the imaging device and less than or equal to 7.

6. The digital camera as claimed in claim 5, wherein the setter
    sets the set exposure value for a first frame at the initial value;

sets the set exposure value for a second frame at a value obtained by adding a value two times greater than an adjustment amount to the set exposure value for the first frame, the adjustment amount being obtained based on the difference between the first exposure value and the second exposure value; and sets the set exposure value for a third frame at a value obtained by subtracting the adjustment amount from the set exposure value for the second frame.

* * * * *